United States Patent
Barajas-Olalde et al.

(10) Patent No.: US 12,228,695 B2
(45) Date of Patent: Feb. 18, 2025

(54) DETECTION OF BURIED PIPELINES AND SPILLS

(71) Applicant: Energy and Environmental Research Center Foundation, Grand Forks, ND (US)

(72) Inventors: César Barajas-Olalde, Grand Forks, ND (US); Saurabh Ajit Chimote, Grand Forks, ND (US); Jordan Michael Krueger, Grand Forks, ND (US); Donald C. Adams, III, Grand Forks, ND (US)

(73) Assignee: Energy and Environmental Research Center Foundation, Grand Forks, ND (US)

(*) Notice: Subject to any disclaimer, the term of this patent is extended or adjusted under 35 U.S.C. 154(b) by 681 days.

(21) Appl. No.: 17/657,205

(22) Filed: Mar. 30, 2022

(65) Prior Publication Data

US 2022/0317328 A1     Oct. 6, 2022

Related U.S. Application Data

(60) Provisional application No. 63/200,853, filed on Mar. 31, 2021.

(51) Int. Cl.
*G01V 3/38* (2006.01)
*G01V 3/08* (2006.01)
(Continued)

(52) U.S. Cl.
CPC ............. *G01V 3/38* (2013.01); *G01V 3/081* (2013.01); *G01V 3/16* (2013.01); *G01V 11/00* (2013.01);
(Continued)

(58) Field of Classification Search
CPC . G01V 3/38; G01V 3/081; G01V 3/16; G01V 11/00; G01V 1/50;
(Continued)

(56) References Cited

U.S. PATENT DOCUMENTS

| 7,414,395 B2 * | 8/2008 | Gao | G01N 27/82 |
| | | | 324/228 |
| 9,856,020 B1 * | 1/2018 | Gordon | G06N 3/08 |

(Continued)

FOREIGN PATENT DOCUMENTS

WO    WO-2009145636 A2 *  12/2009  ............. G01V 3/165

OTHER PUBLICATIONS

Xiang, Ning, "An experimental study on antipersonnel landmine detection using acoustic-to-seismic coupling", J. Acoust. Soc. Am. 113(3), (Mar. 2003), 1333-1341.

*Primary Examiner* — John Villecco
*Assistant Examiner* — Alejandro Hernandez
(74) *Attorney, Agent, or Firm* — Schwegman Lundberg & Woessner, P.A.

(57) ABSTRACT

Methods, systems, and computer programs are presented for detecting buried pipelines and spills. One method includes operations for programming a drone to fly over a geographical area, and for capturing, during a flight of the drone, geophysical data with geophysical equipment in the drone. Further, the method includes capturing, during the flight of the drone, images with a camera in the drone. A machine-learning (ML) model is utilized to identify locations of buried pipes and spills based on the captured geophysical data and the captured images. Further, the method includes presenting the identified locations of the buried pipes and spills in a map of the geographical area.

20 Claims, 20 Drawing Sheets

(51) Int. Cl.
*G01V 3/16* (2006.01)
*G01V 11/00* (2006.01)
*G06T 7/70* (2017.01)
*G06V 10/774* (2022.01)
*G06V 20/17* (2022.01)

(52) U.S. Cl.
CPC .............. *G06T 7/70* (2017.01); *G06V 10/774* (2022.01); *G06V 20/17* (2022.01); *G06T 2200/24* (2013.01); *G06T 2207/10032* (2013.01); *G06T 2207/20081* (2013.01)

(58) Field of Classification Search
CPC .............. G01V 2210/6163; G06T 7/70; G06T 2200/24; G06T 2207/10032; G06T 2207/20081; G06T 1/0007; G06V 20/17; B64U 2201/10; B64U 2101/30; G01K 1/026; F17D 5/00; G03B 15/006; A63B 2220/05; G01C 21/30; G01C 21/20; G06N 20/00; G06N 3/08
See application file for complete search history.

(56) References Cited

U.S. PATENT DOCUMENTS

| | | | |
|---|---|---|---|
| 2011/0196534 A1* | 8/2011 | Ekes | F17D 5/00 901/44 |
| 2016/0252422 A1* | 9/2016 | Howitt | E03B 7/071 73/40.5 A |
| 2019/0137653 A1* | 5/2019 | Starr | G01V 8/005 |
| 2021/0216852 A1* | 7/2021 | Reece | G08B 29/20 |

\* cited by examiner

SPILL STARTS

NO CHANGES ON SURFACE

SATELLITE IMAGERY DOES NOT CHANGE

DETECTION

DETECTION OF BURIED PIPELINES AND SPILLS

CROSS-REFERENCE TO RELATED APPLICATIONS

This application claims the benefit of U.S. Provisional Patent No. 63/200,853, entitled "Detection of Buried Pipelines and Spills," filed on Mar. 31, 2021. This provisional application is herein incorporated by reference in its entirety.

STATEMENT REGARDING FEDERALLY SPONSORED RESEARCH OR DEVELOPMENT

This invention was made with support of the State of North Dakota under North Dakota Industrial Commission (NDIC), Contract No. SERC 2019-01. The State of North Dakota has certain rights in the invention.

TECHNICAL FIELD

The subject matter disclosed herein generally relates to methods, systems, and machine-readable storage media for detecting buried pipelines and spills.

BACKGROUND

The last decade has seen growth in the oil industry. For example, there are over 12,000 oil wells in North Dakota, with oil production undergoing a nearly fivefold increase since 2008. Nearly 23,000 miles of gathering pipelines have been installed to move these tremendous volumes of fluids from the wellhead to various processing facilities.

While most of the fluids moving through the buried pipeline infrastructure reach their destination without incident, the system's ever-increasing size means that even low rates of pipeline failures may result in a high number of spills each year. Public concern has been growing about the effects of spills of oil and produced water on agriculture, public health, and the environment.

When a buried pipeline breaks, it may be a long time until the oil spilled is detected via inspection of the surface, which worsens the impact on the oil flow and the environment. Also, sometimes the location of the pipelines may not be known with certainty, so it's not possible to perform visual inspection of the terrain to search for failures.

What is needed are solutions to detect the location of pipelines and to quickly detect problems in the pipelines, even before there are signs on the surface suggesting that the pipelines may have cracked.

BRIEF DESCRIPTION OF THE DRAWINGS

Various of the appended drawings merely illustrate example embodiments of the present disclosure and cannot be considered as limiting its scope.

DETAILED DESCRIPTION

Example methods, systems, and computer programs are directed to detecting buried pipelines and spills. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Some solutions for detecting spills in pipelines rely on analysis of aerial images of the terrain (e.g., satellite images) to detect changes on the surface. However, these solutions are not able to detect problems until the damage is extensive and affects the appearance of the surface.

In one aspect, geophysical data, about the subsurface where the pipelines are located, is gathered and processed with data processing algorithms (e.g., Machine Learning (ML) models) to reduce the time to detect buried pipelines and spills based on their geophysical signature, allowing the detection of pipelines and spills even when there are no apparent changes on the surface. Some examples of geophysical data include seismic data, magnetic data, electric data, thermal data, etc. Although embodiments are presented with reference to magnetic data, the same principles may be applied to other types of geophysical data.

One general aspect includes a method that includes operations for programming a drone to fly over a geographical area, and for capturing, during a flight of the drone, geophysical data with geophysical equipment in the drone. Further, the method includes capturing, during the flight of the drone, images with a camera in the drone. A machine-learning (ML) model is utilized to identify locations of buried pipes or leaks based on the captured geophysical data and the captured images. Further, the method includes presenting the identified locations of the buried pipes or leaks in a map of the geographical area.

Figure 1:
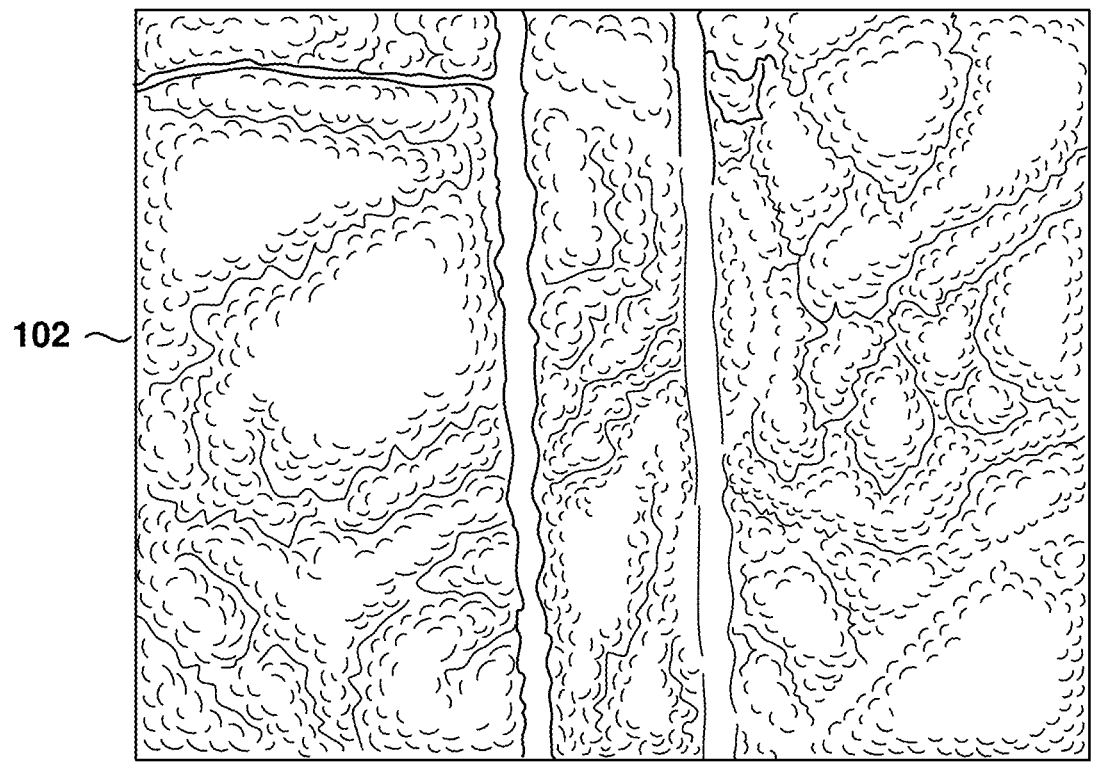
FIG. 1 shows an environment that includes a buried pipeline.
Figure 1:
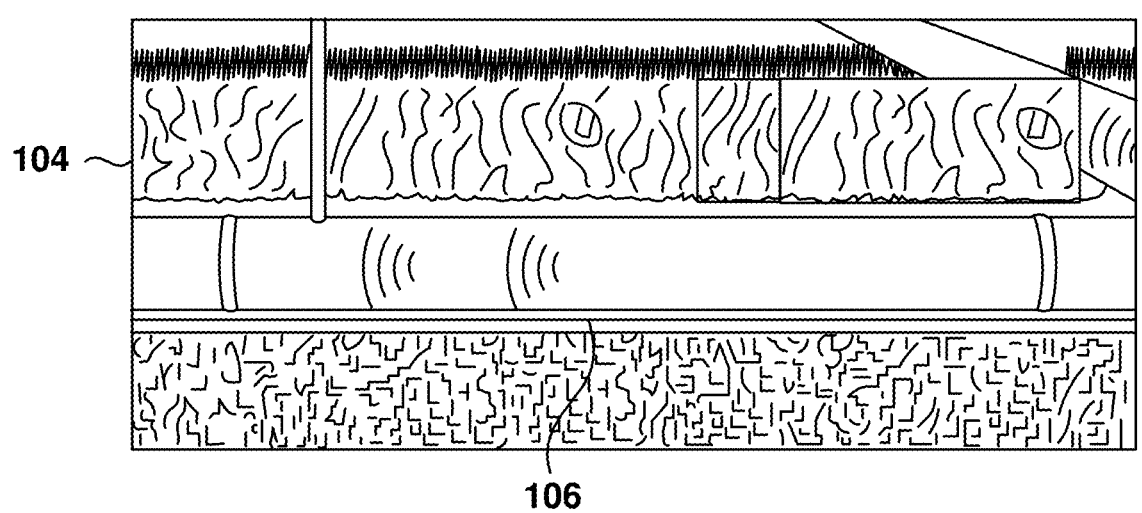

FIG. 1 shows an environment that includes a buried pipeline. Picture 102 is a satellite image of the area where the pipeline is located. The straight paths without trees suggest the location of pipelines.

Diagram 104 shows a pipeline 106 buried under the surface. For example, the pipeline 106 can be 4-48 inches in diameter and buried about 3 to 6 feet deep. In many cases, the pipeline 106 is metallic, but some pipelines may use other materials, such as PVC (polyvinyl chloride) or PVC covered with a metallic layer.

In some cases, the satellite images of the same area taken at different times to detect changes indicating a problem with the pipeline that causes a spill.

Figure 2:
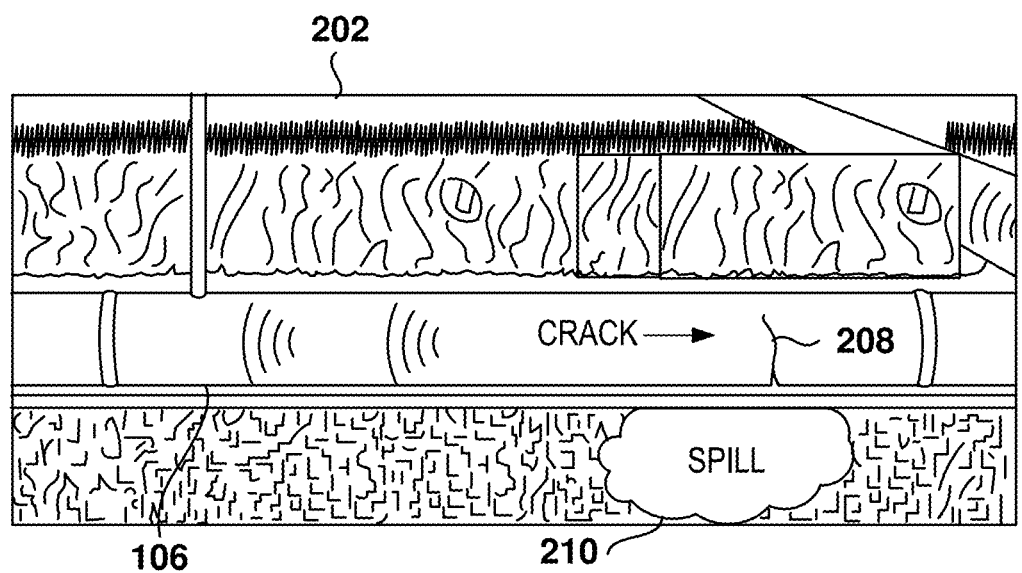
FIG. 2 shows a spill starting because of a crack in the pipeline.

FIG. 2 shows a spill 210 starting because of a crack 208 in the pipeline 106. In diagram 202, a crack 208 in the pipeline 106 has caused a spill 210. The crack 208 may be caused by a ground shift or for some other reason, such as a defect in the pipeline 106.

The spill 210 is causing changes in the area under the pipeline 106, but the spill 210 has not shown on the satellite images because there are no changes on the surface that can be detected by visual inspection. In general, considerable volumes of fluids must be spilled before the spill 210 affects the surface. Thus, cost-effective monitoring technologies that can rapidly and efficiently detect spills in the subsurface at proximity to the pipeline are highly desirable.

Figure 3:
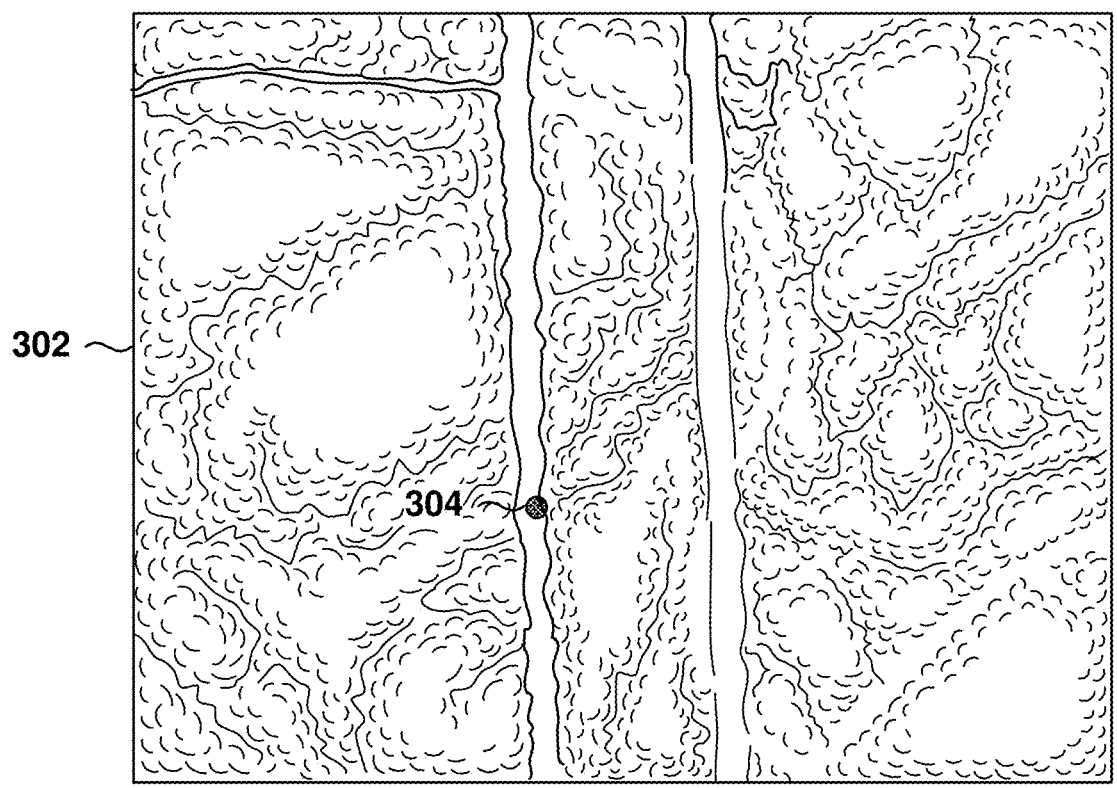
FIG. 3 shows detection of the spill via satellite image after the spill causes changes on the surface, according to some example embodiments.
Figure 3:
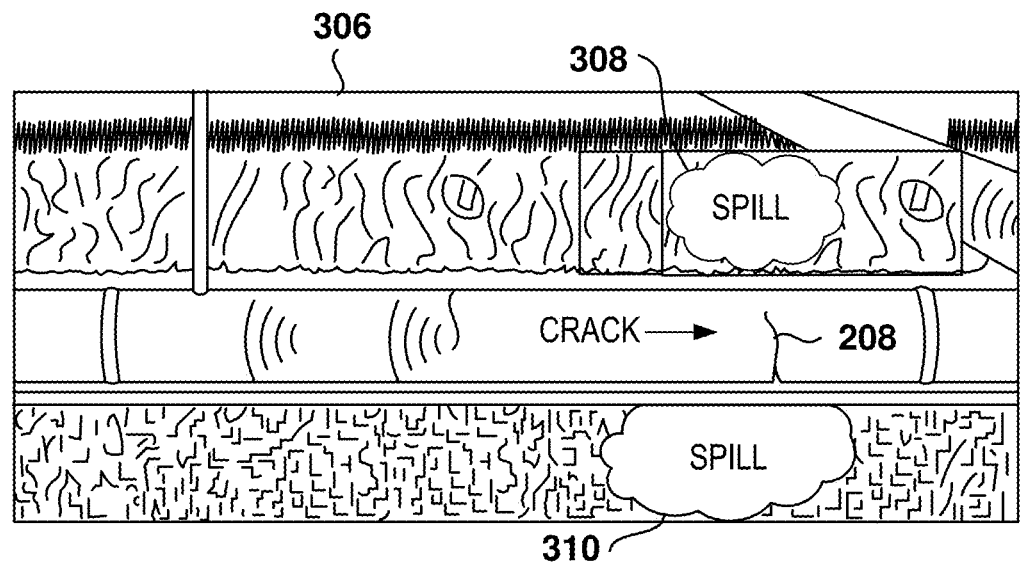

FIG. 3 shows detection of the spill 308 via satellite image after the spill causes changes on the surface, according to some example embodiments. As shown in diagram 306, the crack 208 has caused the spill to spread above 308 and below 310 the pipeline 106. The surface is now affected as the spill 310 has created a shift of the ground above the pipeline 106.

The satellite image 302 now shows a change on the surface in area 304; therefore, satellite-image analysis is able to detect a potential problem in the pipeline 106.

Figure 4:
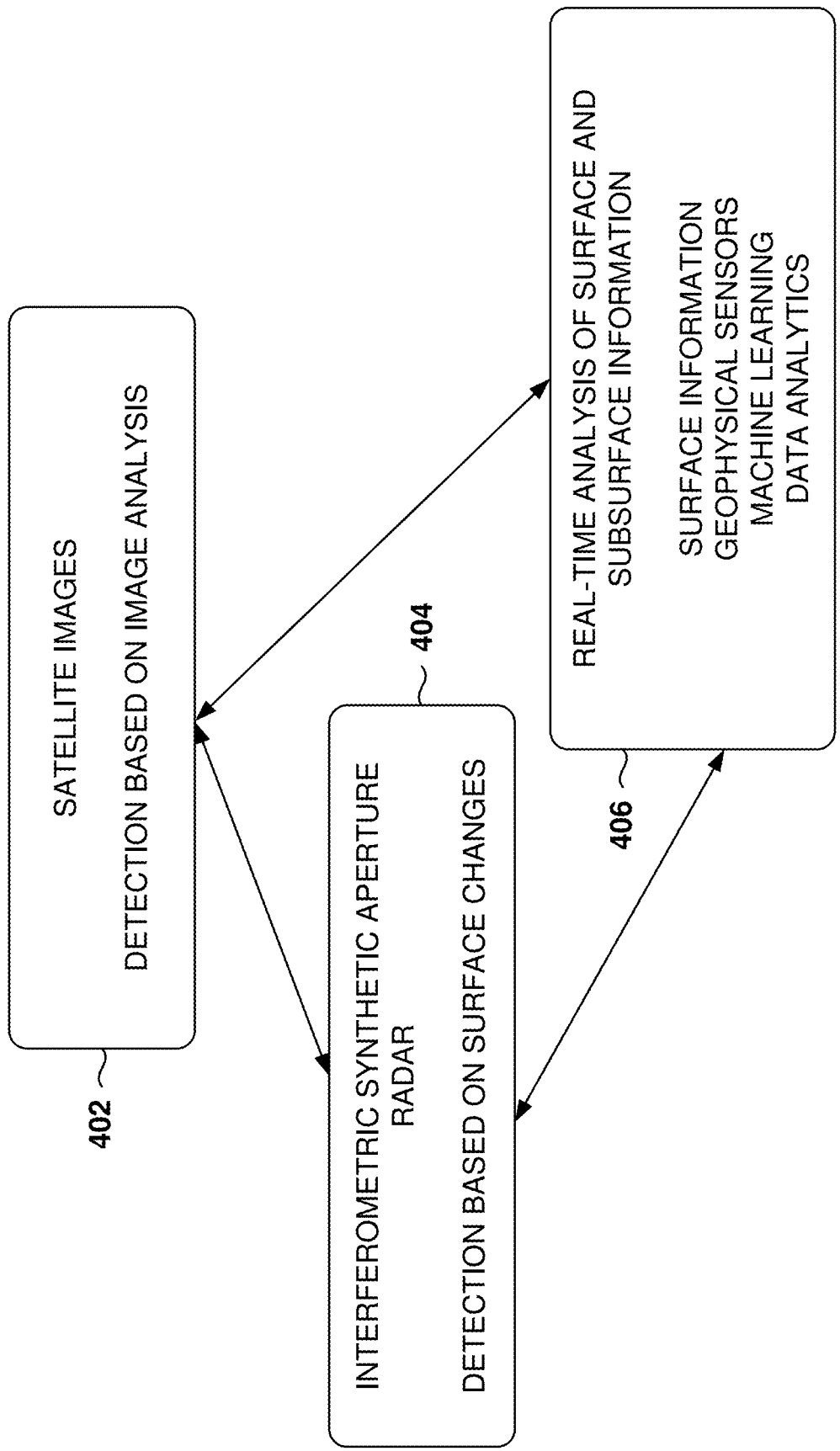
FIG. 4 illustrates several techniques for pipeline and spill detection, according to some example embodiments.

FIG. 4 illustrates several techniques for pipeline and spill detection, according to some example embodiments. There are several techniques for detecting buried pipelines and spills, and these techniques may be used alone or in combination.

Detection via analysis of satellite images 402 is effected for analyzing large areas and ongoing monitoring does not require deployment of resources on the field.

Further, interferometric synthetic aperture radar (InSAR) 404 is used to detect surface movement and surface changes. InSAR is a radar technique used in geodesy and remote sensing that uses two or more synthetic aperture radar (SAR) images to generate maps of surface deformation or digital elevation, using differences in the phase of the waves returning to the satellite or aircraft. The technique can potentially measure millimeter-scale changes in deformation over spans of days to years. It has applications for geophysical monitoring of natural hazards, for example earthquakes, volcanoes and landslides, and in structural engineering, in particular monitoring of subsidence and structural stability. InSAR can detect changes of pressure because of fluid, or because of ground settlement (e.g., digging in the vicinity).

Real-time analysis of the surface and subsurface 406 information can detect pipelines and spills before the changes affect the surface. For example, by using drones that obtain geophysical data, it is possible to obtain subsurface information that is analyzed (e.g., ML models) to detect problems.

The analysis of satellite images 402 and the use of InSAR 404 can detect changes of the surface, but if there is no manifestation of changes on the surface, these methods will fail to detect problems. By accessing subsurface information, it is possible to detect small problems before they turn into big problems. Also, by detecting problems earlier, it is possible to minimize the amount of oil spilled on the ground.

Sometimes, an oil company may detect that there is a leak in the segment of the pipeline by measuring the flow of oil and detecting that oil is being lost. If the satellite analysis does not produce any results, a drone may be deployed in the area to obtain subsurface information and detect problems that may not be found via satellite data.

Figure 5:
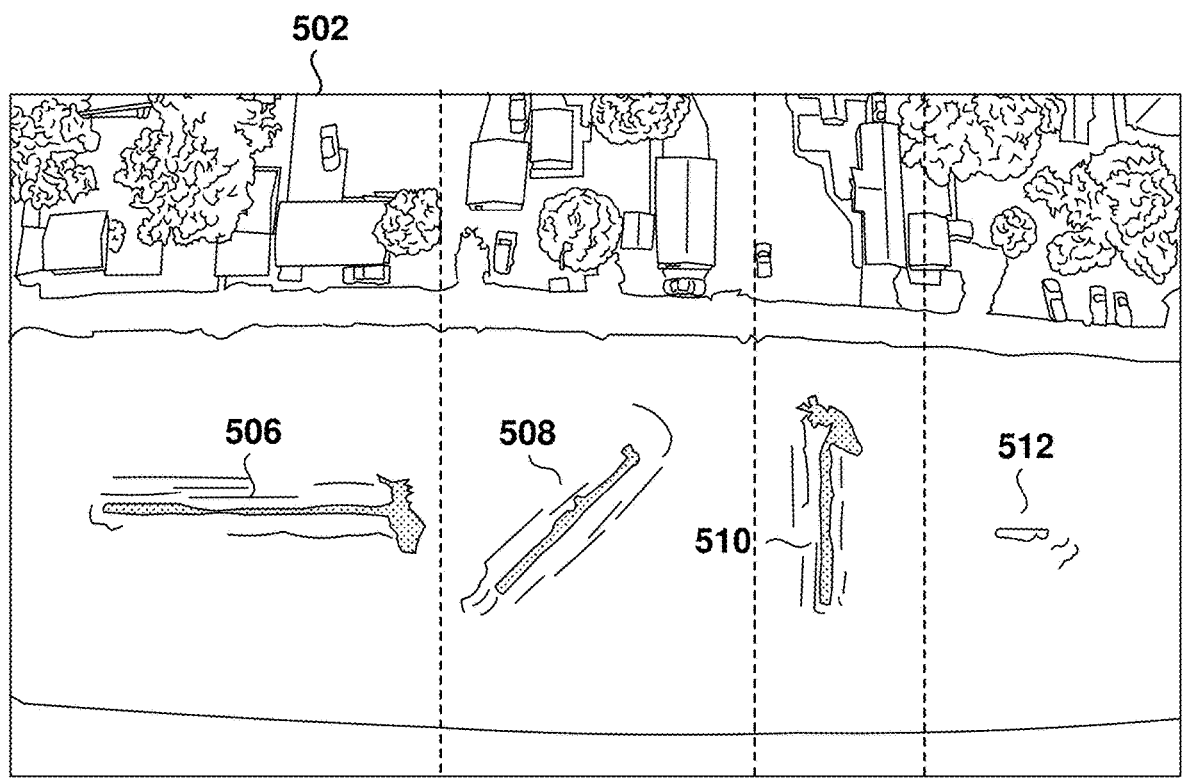
FIG. 5 shows a test environment for detecting pipelines, according to some example embodiments.

FIG. 5 shows a test environment for detecting pipes, according to some example embodiments. The testing was for an area of 50 ft by 334 ft with pipes buried at a depth of 15 inches. Image 502 shows three pipes 506, 508 and 510 were metallic and one pipe 512 was a PVC pipe wrapped with a metallic sheet, the pipes being 6 inches in diameter. Map 504 shows the location of the pipes.

The potential impact of the magnetic signals due to cars parked on the streets and metallic infrastructures of structures surrounding the study area was considered before the field experiments; therefore, magnetic measurements were taken before the final field experimental setting was defined.

Measurements were taken with magnetic gradiometer on the area to identify magnetic objects that could interfere with the magnetic readings for detecting the pipes. The gradiometer provided the vertical differential magnetic field between two fluxgate magnetometers located 20 inches away on the sensor tub. No significant magnetic anomalies that could interfere with the field experiment were observed.

A drone was flown over the test area to gather geophysical data, and this data was used to analyze the subsurface and detect the location of the pipes. During testing, the analysis included analyzing the aerial data captured in photographs as well as the geophysical data to search for the pipes after they were buried. ML models were trained with supervised learning using the data captured and the known information of the location of the pipes.

It was expected that the magnetic anomalies from the selected pipes' diameter and depth for the field experiment would be similar to the anomalies from the oil and gas pipelines in the field. As used herein, an anomaly refers to a value that is substantially different from values in the nearby region, e.g., the value is a predetermined percentage above the average value in the nearby region. For example, the anomaly may indicate that a magnetic reading is 50% higher than the average, although other thresholds may be utilized.

This assumption is based on the mathematical non-uniqueness of the solutions related to the estimation of geometry and depth of the bodies generating magnetic anomalies. The non-uniqueness illustrates the similarity of magnetic anomalies from small magnetic bodies at shallow depths with deeper, big magnetic bodies.

The pipe distribution was to maximize pipe sampling when flying in the north-south and east-west directions. The pipe distribution also simulates field cases when there is no knowledge about pipe orientation, and the UAS crosses the pipes at different angles. The four locations of the pipes are called A (east-west) for pipe 506, B (diagonal) for pipe 508, C (north-south) for pipe 510, and D (east-west) for PVC pipe 512. Soccer cones were deployed on the ground of the study area to investigate the use of auxiliary information to detect pipelines.

Photographs, videos, and thermal images of the surface were acquired along with the east-west and north-south directions. The images were geolocated with GPS information so that they can be used in real-time and postflight conditions. High-altitude images and magnetic measurements were also taken during the experiments to analyze the potential effect of UAS magnetic noise on the magnetometer.

Embodiments are described with reference to detecting buried pipes, but the same principles may be used to detect spills by using training data corresponding to locations with spills and then apply the trained ML models to the detection of spills.

Figure 6:
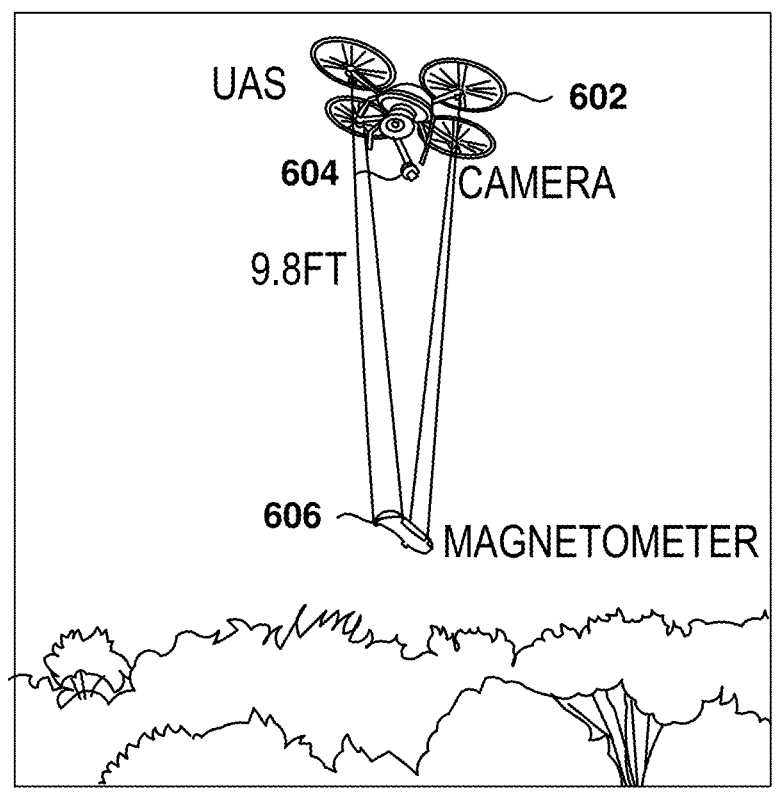
FIG. 6 shows an Unmanned Aircraft System (UAS), also referred to as a drone, equipped with equipment for examining the subsurface, according to some example embodiments.

FIG. 6 shows an Unmanned Aircraft System (UAS), also referred to as a drone 602, equipped with equipment for examining the subsurface, according to some example embodiments.

The drone 602 used for surveying is generally equipped with a global positioning system (GPS), an altimeter, a camera 604, a communication unit, and one or two sensors to explore Earth's surface conditions. Electro-optical, thermal, multispectral, and light detection and ranging (LiDAR) are some examples of these sensors. The illustrated example carried a magnetometer 606 that weighed about 1.15 Kg.

In some tests, mission-planning software was used to perform autonomous field flights and enabled complex missions involving setting the aircraft altitude and heading at all waypoints, wait times before passes to reduce magnetometer sway, and width between passes for precise control and little variation.

In some testing, a MagArrow magnetometer from Geometrics was used. This miniature fabricated atomic magnetometer (MFAM™) is a laser-pumped cesium vapor total field scaler magnetometer. A measured value of this absolute magnetometer is equal to the strength of the magnetic field and does not depend on time, temperature, and orientation.

In some example testing, magnetic measurements were acquired at a 1000-Hz sample rate synchronized to an on-board GPS (typical 1 m accuracy), 1 pulse per second (PPS), which allowed the system to function independently of the UAS and the UAS software. The surveys were completed at speeds up to 10 m/s with samples every 1 cm. The magnetometer was able to filter out UAS motor noise. In some testing, the output data was downloaded via Wi-Fi over a 2.4-GHz access point.

A Zenmuse XT2 electro-optical/thermal camera, a Zenmuse Z3 HD camera, and an EIC-MS-VISION-500 Artificial Intelligence (AI) and Internet of Things (IoT) cameras were attached to the UAS. The two Zenmuse cameras were attached directly to the aircraft gimbal, and the IoT camera was fixed to the UAS with two plastic strips.

The Zenmuse XT2 electro-optical/thermal camera is a combination of FLIR's advanced radiometric thermal sensor and 4K visual sensor. The thermal camera provided a thermal image that was an uncooled $VO_x$ microbolometer with a pixel pitch of 17 μm and a spectral band of 7.5-13.5 μm.

The electro-optical camera included a sensor 1/1.7-in. CMOS with 12 M effective pixels, with a prime lens with a focus at 8 mm and FOV 57.12°×42.44°.

The Custom Vision AI Devkit EIC-MS-VISION-500 camera is powered by the Qualcomm AI engine to run machine learning models in IoT devices. The camera combines the Azure Machine Learning and Azure IoT edge services from Microsoft and the Qualcomm Vision Intelligence Platform's edge computing power. As an intelligent $edge_1$ device, the Vision AI DevKit does inferences and runs containerized Azure services locally in the device. Instead of sending the image to the cloud for inference, waiting for processing, and hoping that the network quickly sends the response, the platform can evaluate the image locally in real time. The advantages of that kind of edge computing include better security and privacy, faster processing, and less need for network bandwidth.

Inside the QualcommAI-Engine is the Qualcomm Neural Processing SDK for AI, a software framework with tools for analyzing, optimizing, and debugging machine language projects. Dedicated hardware in the Qualcomm Vision Intelligence Platform, built on the Qualcomm QCS603 (QCS603 SoC, n.d.) system on chip (SoC), accelerates the Qualcomm Neural Processing SDK. Together, the hardware, software, and cloud components are designed to deliver real-time vision AI at the edge, without the need for high-powered machines or a continuous network connection.

A Verizon Jetpack 4G LTE Mobile Hotspot MiFi 6620L, powered by Qualcomm MDM9625 processor, was used to serve up the internet connectivity. Further, a NVIDIA Jetson Nano CUDA-X AI computer delivered 472 GFLOPS of computing performance for running AI workloads and is highly power-efficient, consuming as little as 5 watts.

In some tests, the drone flew at a height of four feet, but other altitudes are also possible. It is noted that the embodiments illustrated in FIG. 6 are examples and do not describe every possible embodiment. Other embodiments may utilize different configurations, cameras, geophysical equipment, etc. The embodiments illustrated in FIG. 6 should therefore not be interpreted to be exclusive or limiting, but rather illustrative.

Figure 7:
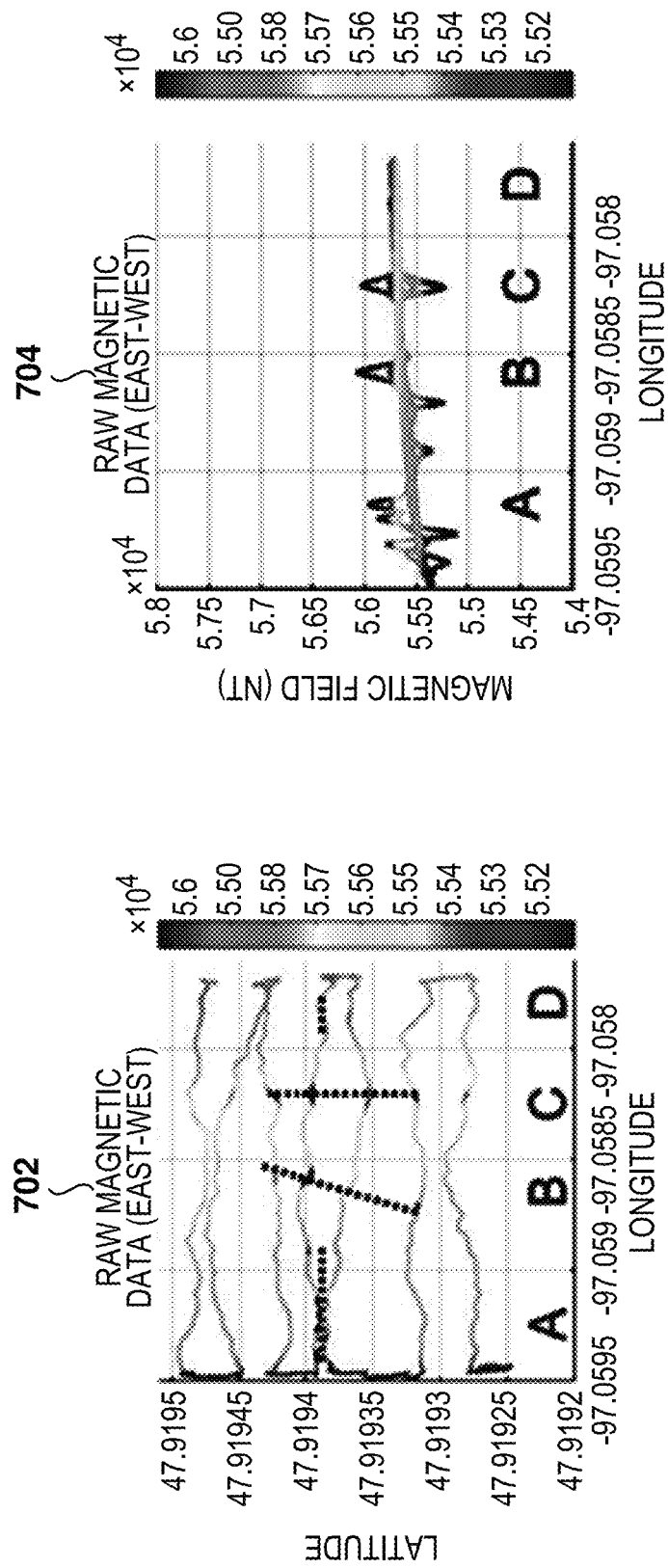
FIG. 7 shows results obtained after flying the drone over the test area, according to some example embodiments.

FIG. 7 shows results obtained after flying the drone over the test area, according to some example embodiments. Geophysical methods are used to study the shallow subsurface (tens of meters—the so-called near-surface) where the pipelines are buried. These methods can be applied in a time-lapse manner to detect changes in the near surface.

The drone speed for all the flights was approximately 17 mph (8 m/s), with 6 and 12 ft separation between survey lines (flight paths) programmed for east-west and north-south directions, respectively. These distances were selected to optimize the study area's spatial sampling while taking into consideration the maximum flight time of the drone.

Chart 702 depicts magnetic data from one experiment with the east-west flight direction, with a horizontal axis for the longitude and the vertical axis for the latitude. The labels A, B, C, and D indicate the pipe locations. The intensity of the magnetic field data detected is color coded, and the magnetic anomalies at the A, B, and C sites are evident. The magnitude of the magnetic anomaly at site D with the shielded PVC pipe is much smaller than the rest of the steel pipes' anomalies.

Chart 704 shows the intensity of the magnetic data for the east-west flight with a vertical axis for the magnetic field intensity. The magnitude of the anomalies caused by the pipes is also evident in chart 704.

The differences between the observed and synthetic magnetic anomalies may be due to magnetic susceptibility, the remanent magnetization of the steel pipes, and the pipes' irregular sampling due to the swinging of the magnetometer attached to the UAS. This swinging is observed in chart 704 as irregular paths from the GPS. Although the drone programmed trajectories, speed, and wait times before passes were optimized after several experiments to reduce sway, the magnetometer swinging was still observed in all the experiments.

In some example embodiments, the magnetic data in binary format was gathered and stored in a data logger during the flights. The data was downloaded after finishing the experiments and converted to comma-separated values (CSV) format. In some example embodiments, the data included the following columns: 1) a counter that increments by one for each new magnetometer reading; 2) a date for the UTC measurement, in HH:MM: SS.sss format, at which the measurement occurred; 3) latitude in degrees north or south as a decimal number; 4) longitude in degrees east or west as a decimal number; and 5) the magnetic field readings in nT as a decimal number, with a flag indicating when a reading is valid.

Figure 8:
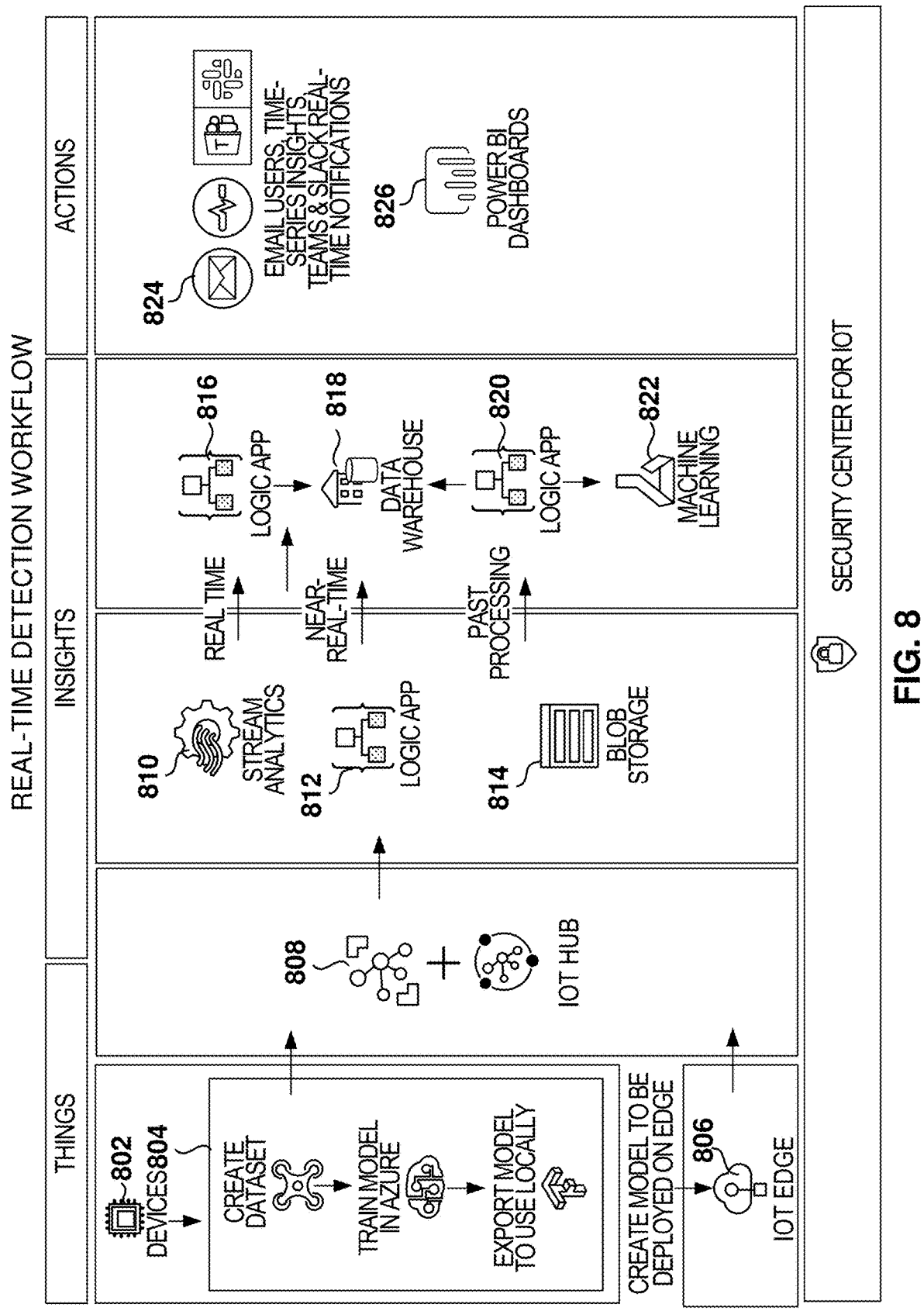
FIG. 8 is a real-time workflow for detecting pipelines and spills, according to some example embodiments.

FIG. 8 is a real-time workflow for detecting pipelines and spills, according to some example embodiments. Integrating surface information from cameras or videos and subsurface data from geophysical surveys is challenging because of the massive amount of data and the required skill set to analyze the data. Data analytics and machine learning algorithms are used to address this challenge.

Detecting buried pipelines and leaks in real time is important to ensure that the pipeline system continues operating without incidents. However, detecting in real time is challenging due to the large amount of data to be processed. In some example embodiments, cloud resources are used to achieve a state-of-the-art system for real-time detection.

The cloud, according to NIST (National Institute of Standards and Technology), is defined as a model for enabling ubiquitous, convenient, on-demand network access to a shared pool of configurable computing resources (e.g., networks, servers, storage, applications, and services) that can be rapidly provisioned and released with minimal management effort or service provider interaction. Cloud computing (CC) has emerged as a new model for hosting and delivering services over the internet in recent years. CC can satisfy technological requirements quickly and automated by increasing the capacity to add capabilities without investing in new infrastructure.

In some example embodiments, an IoT device is used to communicate with the cloud services. IoT is the network of physical objects that contain embedded technology to communicate and sense or interact with their internal states or the external environment. IoT is a result of the convergence between the worlds of information technology (IT) and operational technology (OT). IoT consists of distributed systems that facilitate observing the physical world by combining and analyzing the resulting data, making informed decisions, altering the physical environment, and predicting future events.

Edge computing is used to achieve real-time detection where information processing is located close to the edge, where things and people produce or consume that information. Edge computing offers near real-time insights, faster-localized actions, and cost reduction because of efficient data management and operations and is an alternative to the centralized, in-the-cloud computing paradigm. In some example embodiments, the edge computing is performed at the IoT camera attached to the drone communicating with the cloud.

In some example embodiments, Microsoft Azure was the cloud service provider for real-time pipeline detection, but other cloud service providers could be used, such as Google and Amazon.

The real-time detection workflow used is shown in FIG. 8. One goal is to generate an immediate notification of an anomaly triggered by the presence of a buried pipe and generate actionable intelligence. The presence of a buried pipe is determined by the combination of magnetic values and the objective probability of the model processed on the IoT camera. For efficient execution, the workflow is divided into three features, 1) real-time notification, which provides a notification of a preliminary existence of a pipeline instantly; 2) near-real-time-notification, which provides more detailed information about the nature of the anomaly after a few seconds; and 3) postprocessing, which provides a more detailed analysis of an anomaly after the experiment is completed along with tools to make 1) and 2) more accurate and efficient.

In some example embodiments, the workflow includes things, insights and actions. The things (e.g., devices 802) send data that generate insights, and these insights generate actions to improve the real-time detection process.

For example, the IoT camera is the device 802 that sends telemetry data in the form of object detection probabilities. The serverless logic app 812 executes the machine learning web service to determine if an anomaly exists (the insight), and an email 824 is sent to the user (the action).

In some example embodiments, the IoT camera is the device for edge computing, but other embodiments may use other devices. Other embodiments use a Raspberry Pi computer connected to a camera and the geophysical sensor. The edge computing device has to store the machine learning models and perform computations close to the sensors, as well as the ability to communicate via the Internet to the cloud.

In some example embodiments, object detection is based on the satellite images to detect changes on the surface. The ML model provides probabilities of detecting the pipeline or the spill.

During some experiments, the available geophysical sensor did not provide data in real time, e.g., the data is stored in the memory of the geophysical sensor and later retrieved. In some experiments, a simulation was made to use previously stored magnetic data to test real-time detection using the magnetic data.

In some example embodiments, a model is created to be deployed 804 at the edge, which includes creating a training dataset, training a ML program to create an ML model, and then exporting the ML model to be used locally (e.g., at the drone, or at a computer on the field in communication with the drone).

In some example embodiments, regarding the real-time notification workflow, devices such as a magnetometer, GPS, and IoT edge 806 camera passes the telemetry information to the IoT Hub 808. The acquired telemetry is ingested by stream analytics 810, which analyzes the real-time telemetry streams.

The logic app 816 routes the data, received from the stream analytics 810, to various modules such as a data warehouse 818. The logic app 816 fetches the historic magnetic value, including anomalies based on the geolocation, and saves the telemetry data in the data warehouse 818. The logic app 816 also generates an instant notification (e.g., email 824), thus enabling real-time notifications. The notification may be an email, a text message, a message on a collaboration tool (e.g., Microsoft teams), etc.

In the near-real-time flow, the logic app 812 fetches the telemetry from the edge camera and the magnetic values and executes a web service that calls the ML model 822 to compute the presence of a probability along with its confidence. An email 824 is sent to the user summarizing the ML models' probability values, the magnetic values, historic anomaly flags, time stamps, and GPS locations. A Power BI dashboard 826 is used to visualize the data in various formats and provide an interactive dashboard that provides options for quick data exploration. Further, the Power BI dashboard 826 includes a telemetry dashboard for real-time pipeline detection that provides insights and real-time notifications.

Postprocessing is primarily used for quality control and to learn, identify, and correct the real-time process, e.g., to make the ML 822 model more accurate. For example, to perform a quality check, when an image is uploaded in blob storage, the logic app 820 extracts metadata associated with the new image and, based on its geolocation, queries the data warehouse 818 to associate with an object probability, stores the information back in the data warehouse 818, and displays the data on the Power BI dashboard 826.

Similarly, newly added images to the blob storage 814 database can also be trained (e.g., on a neural network) to generate a better ML model. The warehouse data can also be used to refine the existing ML model to predict anomalies better, and a web service can be deployed in Power BI.

In some example embodiments, thermal data is used as the geophysical data, that is, the thermal data is used to detect buried pipes or spills. Multispectral surface soil moisture (0-10 cm deep) is estimated using a combination of thermal, near-infrared, and visible imaging systems in a ML model. Experiments with thermal data are conducted and the results may be used to train a thermal ML model used for pipe and leak detection. Thermal imaging under some conditions can detect buried pipes and leaks where there is a temperature difference with the surrounding soil caused by the pipe or the spill.

Figure 9:
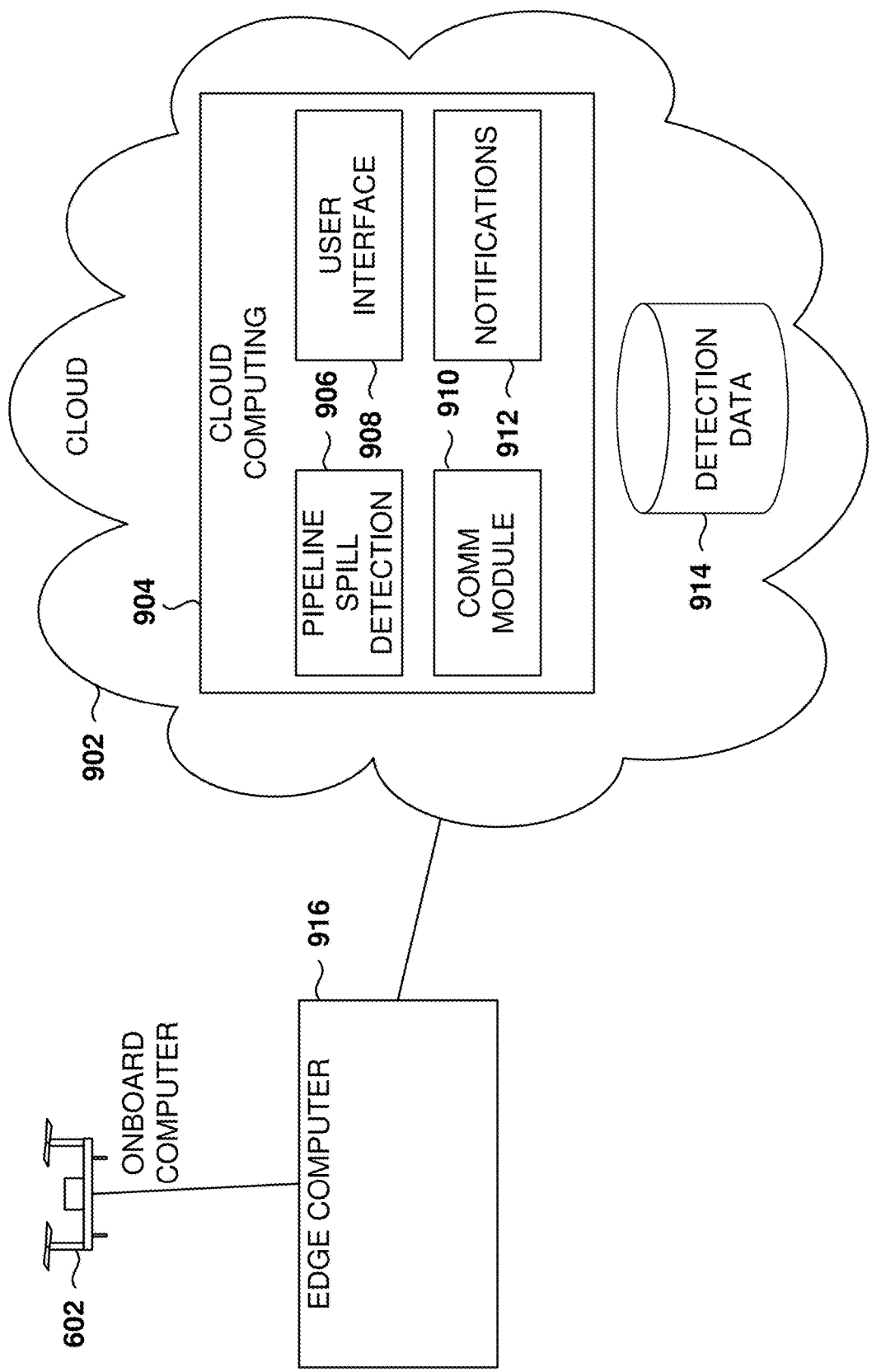
FIG. 9 illustrates a distributed architecture for pipeline and spill detection, according to some example embodiments.

FIG. 9 illustrates a distributed architecture for pipeline and spill detection, according to some example embodiments. The distributed architecture includes an onboard computer in the drone 602, an edge computer 916, and cloud resources 902, which include cloud computing 904 and cloud storage that includes a detection-data database 914.

The detection algorithms may be executed on the onboard computer, the edge computer 916, or the cloud computing 904. As illustrated, the modules of the cloud computing 904 are illustrated, but the same modules may be implemented on the onboard computer or the edge computer 916, although the resources available may differ and the detections operations will be scaled accordingly.

The cloud computing 904 includes a module for pipeline and spill detection 906, a user interface 908, a communications module 910, and a notifications module 912. The module for pipeline and spill detection 906 manages the activities for setting up testing, receiving measurement data, analyzing the data (e.g., from images, from geophysical equipment), and making the results available, such as via the user interface 908.

The user interface 908 may include a graphical user interface or some other ways of communicating with the user. The user interface 908 provides options for the configuration and use of the detection tools. The notifications module 912 includes programs for sending communications to the user, such as email notifications, text messages, etc. The communications module 910 provides communication with other devices, such as the onboard computer on the edge computer 916.

The detection-data database 914 stores data related to detection activities, such as ML training sets, ML-model data, field measurements, test data, etc.

Figure 10:
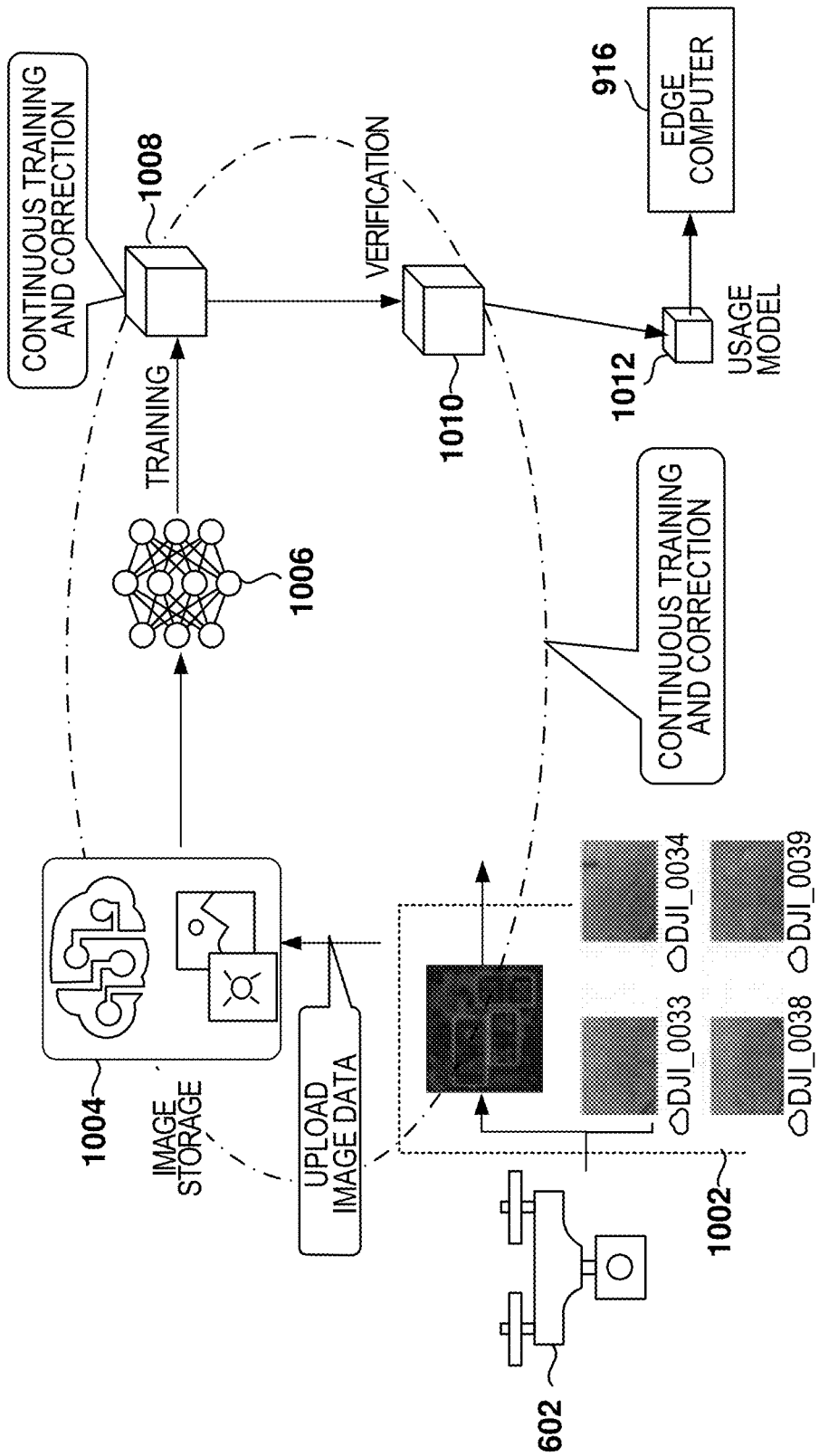
FIG. 10 illustrates the process of using machine learning (ML) and ongoing improvements to the models used for pipeline and spill detection, according to some example embodiments.

FIG. 10 illustrates the process of using machine learning (ML) and ongoing improvements to the models used for pipeline and spill detection, according to some example embodiments.

In some example embodiments, Custom Vision, an AI service offered by Microsoft, is used for applying computer vision for object recognition. The Azure Custom Vision API is a cognitive service that can build, deploy, and improve custom image classifiers. An image classifier is an AI service that sorts images into classes (tags) according to specific characteristics. Custom Vision permits the creation of classifications. In some example embodiments, the image classification of this cognitive service is based on deep neural nets such as ResNet, AlexNet, and Resnet-152 algorithms.

FIG. 10 illustrates the operations used to develop and train a Custom Vision model. Initially, the images 1002 are acquired from the drone 602 and placed in storage 1004. Then the first round of training (e.g., of a neural network 1006) is conducted that results in ML model 1008.

After the ML model 1008, a verification operation 1010 is used to determine the accuracy of the ML model 1008. The ML model 1008 may be refined through several cycles of continuous training and correction by adding additional information, such as new images and updated ML model parameters.

After the training is completed, the ML model 1008 performance is calculated and displayed. Custom Vision Service uses the images submitted for training to calculate precision, recall, average precision (AP), and mean average precision (mAP), which is the average AP value. Precision and recall are two different measurements of the effectiveness of a detector. While precision indicates the fraction of correctly identified classifications, recall indicates the fraction of actual classifications correctly identified. AP (average precision) is an overall measure of model performance. It averages the precision of the model over different probability thresholds. For each model, a threshold should be established by considering these metrics to meet the model's acceptance criteria.

At each iteration, the model is retrained by adding more images of varying backgrounds while maintaining the data balance to train the dataset. This continuous cycle is performed until the model meets a defined threshold.

The criteria for continuous improvement includes one or more of: overfitting prevention by providing images with different angles, backgrounds, object sizes, groups, and other variations; selection of the right quantity of data (e.g., at least 50 images per label) to make good-quality models; maintaining an adequate data balance to maintain at least a 1:2 ratio between the label with the fewest images and the label with most of the images; provide variety of data by choosing the images with varied backgrounds, lighting, object size, camera angle, and style; including negative images, which are those samples that do not match any of the other tags; using prediction images for further training; and providing visual inspection of the predictions.

After the model has been verified and optimized, the final usage ML model 1012 is ready for deployment to detect buried pipes and spills. Further, the ML model 1012 may be deployed on the edge computer 916 for detection at the edge, e.g., at the IoT camera.

In some example embodiments, the Custom Vision functionality can be divided into two: 1) image classification, which applies one or more labels to an image, and 2) object detection, which returns the coordinates in the image where the applied label(s) can be found.

In some example embodiments, the input data includes images recorded by the camera mounted on the drone 602. The images are split into 80% for training data and 20% for testing data, and the training is performed with the training data.

The ML models are defined and created with relevant labels (tags) to find a particular feature accurately. Images from the ground surface on the testing site, and two labels were created: "buried pipes" and cones. The buried pipe is the primary label to depict the ground's signature when a pipe is buried. The cones were soccer cones deployed on the study area as markers to be used for proof of concept, the cone labels representing a secondary object that can help support the detection of the primary object.

Based on these labels, three models are created: 1) An edge model, which is a multiple-object detection model designed to detect buried pipes and cones. 2) A buried-pipe model to detect buried pipes. 3) A cone model specialized in detecting cones.

Images from flights when the pipes were buried were used as input data. These images cover several parts of the pipe signature on the ground or parts of the cones. The images were reviewed and the labels "buried pipelines" or "cones" were assigned to each image for training.

Different methods were used to train each of these models. For example, each image was tagged for the edge model regardless of how the object appeared in the image. If the image captured only a cone's fraction (a frame with 15% of the cone appearing at a given time), the image was tagged and identified as a cone. This approach was considered to aid early detection of an object as soon as it appeared in the frame and prevent overfitting. For the other models, the images were only tagged if they appeared clearly in the image. There were also critical differences between tagging the buried pipe and cone objects. If the edges of the buried pipe were visible, they were tagged. The cones were only tagged if they appeared clearly in the middle of the camera image. This approach was taken for more accuracy and the fact that the camera will not miss the object as it has enough time to capture and tag the object since the camera runs between 30 and 60 frames per second (fps).

Regarding the training of the ML model, the images 1002 are acquired from the drone 602, and then the first round of training is conducted. In a next step, the model is retrained by adding more images of varying backgrounds while maintaining the data balance to train the dataset. This continuous cycle is performed until the model meets a defined accuracy threshold.

After the model is trained, model performance is calculated and displayed. Custom Vision Service uses the images submitted for training to calculate precision, recall, AP, and mAP. Precision and recall are two measurements of the effectiveness of a detector. While precision indicates the fraction of correctly identified classifications, recall indicates the fraction of actual classifications correctly identified. AP (average precision) is an overall measure of model performance and averages the precision of the model over different probability thresholds. For each model, a threshold is established by considering these metrics to meet the model's acceptance criteria.

In some example embodiments, the outputs from the model include the probability of detecting the pipe or a spill and the associated GPS coordinates.

Further, the cone model was used as an example of an indirect object or feature on the surface that can be associated with a pipe or a leak. For instance, some modern pipes have poles nearby to signalize the location of a pipeline, or marks on the ground that can be associated to a buried pipe such as ground spots without grass. In the case of spills, over time, the spills start affecting the vegetation on the surface or the soil, as illustrated in FIG. 3. The cone model represents the soil or vegetation changes, and the cone model adds information to the other detection ML models.

Figure 11:
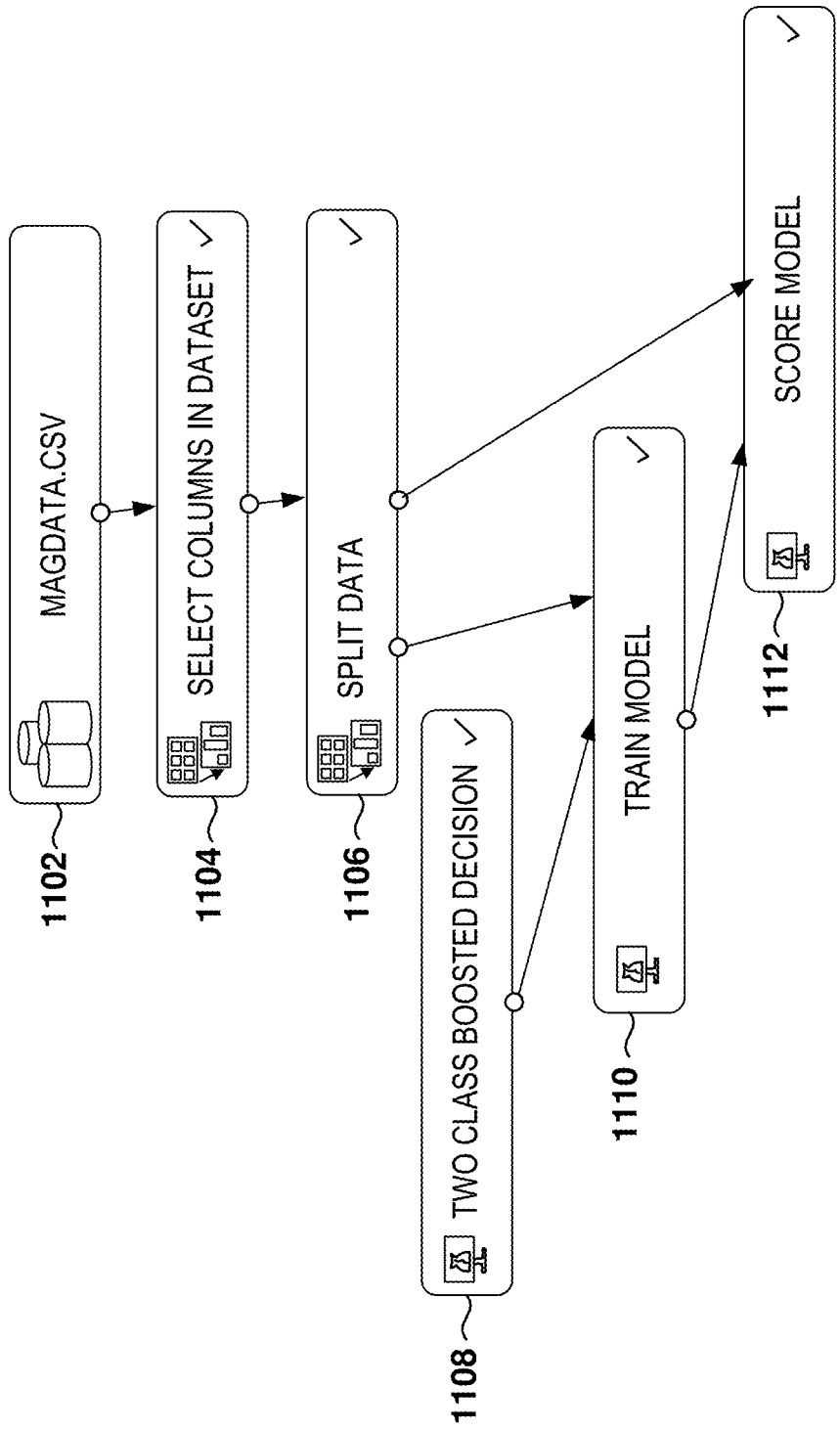
FIG. 11 is a flowchart of a method for using ML models that use magnetic data, according to some example embodiments.

After the models are trained in the Microsoft Azure platform, the models were deployed to the developer kit camera, where the models can run even when they are not connected to the cloud. FIG. 11 outlines the process of deploying the ML model that utilizes magnetic data.

Different ML Algorithms may be used, such as TensorFlow, Caffe/Caffe2, and the ONNX standard to pretrain or retrain steps. In some tests, TensorFlow models were generated and used, but other ML algorithms may be used.

The Azure service was used to package the models into hardware acceleration-ready containers. Azure IoT Edge, a fully managed edge platform for connecting and managing IoT assets at the edge, deploys containers to run on the Qualcomm Vision Intelligence platform. Once the models reach the platform, they take advantage of the Qualcomm Neural Processing SDK and dedicated hardware acceleration, whether on the CPU, GPU, or DSP. The result is a high-performance vision AI inferencing on the edge.

FIG. 11 is a flowchart of a method for using ML models that use magnetic data, according to some example embodiments. A ML workflow was developed to predict magnetic anomalies caused by buried pipes. The relevant columns from the magnetic dataset (MagData.csv) 1102 were selected at operation 1104. In some example embodiments, the magnetic data set includes values for magnetic measurements, moving standard deviation, and anomalies.

The selected columns in the dataset 1102 are then then randomly split 1106 into the train-model dataset 1110 and the score-model dataset 1112. At operation 1108, the model is trained with the train-model dataset 1110 by a two-class boosted decision tree algorithm (Two-Class Boosted Decision Tree), in some example embodiments, and then scored.

A simulation of real-time magnetic data was used, and started with the decimation of 589,001 samples of raw data to simplify the process. This operation is not a requirement in the field, and it was used to overcome some limitations of the equipment. After the decimation, the data are detrended and moving standard deviations are calculated. These values can identify the higher magnetic values associated with the magnetic anomalies due to the pipelines from the raw data as the magnetic field increases from west to east.

During some tests, the input dataset's of 8,407 rows and three columns (magnetic data, magnetic anomaly, and moving standard deviation) were split into two sets, with a 70% ratio for the training set and 30% for the scoring set. The training dataset consisted of 12,885 randomly selected values, and the remaining 30% of the scoring dataset contained 5522 rows.

A binary classifier using a boosted decision tree algorithm was chosen for creating the ML model for detecting a magnetic anomaly. The output scored dataset from the ML model includes scored labels and scored probabilities that there is a magnetic anomaly.

A boosted decision tree is an ensemble learning method in which the second tree corrects for errors of the first tree; the third tree corrects for the first and second trees' errors, and so forth. Predictions are based on the entire ensemble of trees together that make the prediction.

Figure 12:
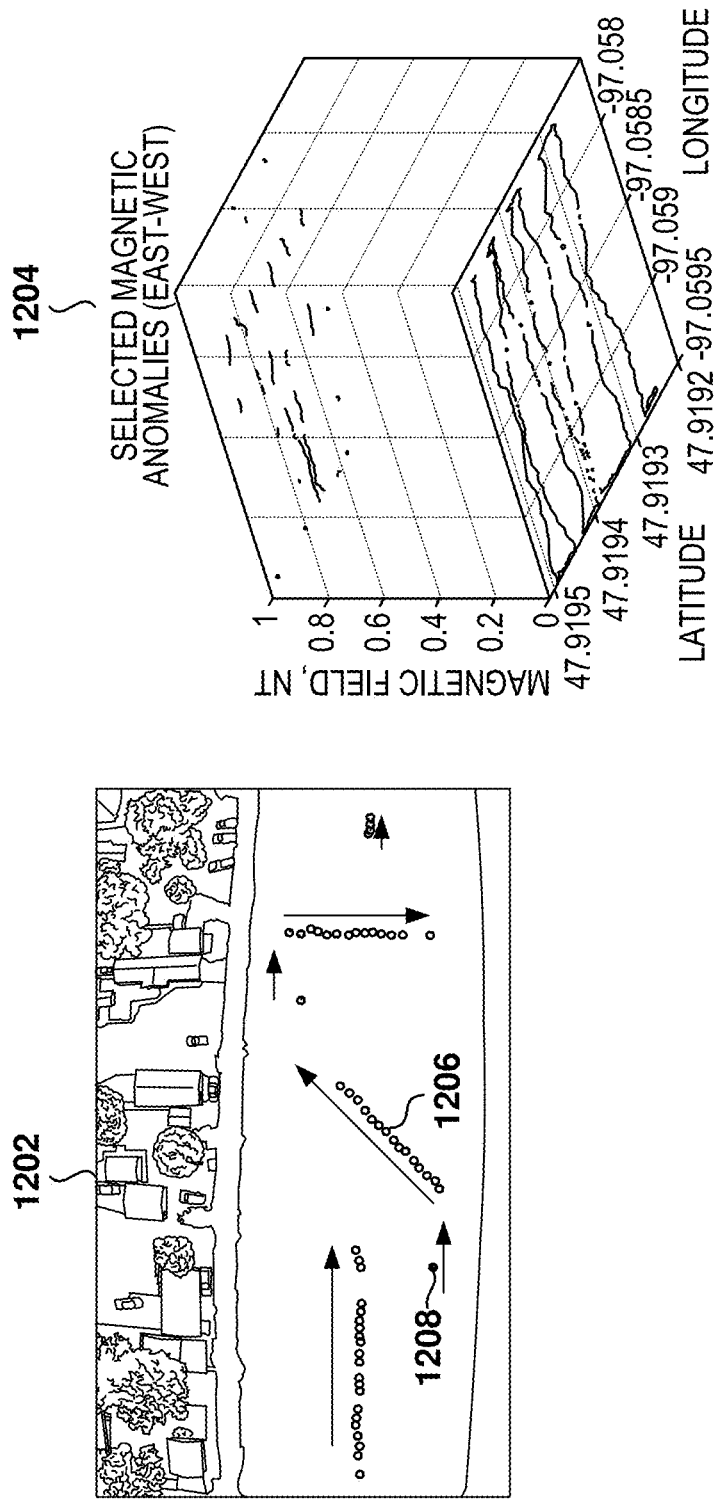
FIG. 12 illustrates the magnetic anomalies detected during the testing, according to some example embodiments.

FIG. 12 illustrates the magnetic anomalies detected during the testing, according to some example embodiments. Image 1202 includes dots 1206 that represent the location of the captured images corresponding to the pipeline anomaly.

Analyzing the enormous amount of data generated from field data acquisitions in real time is a challenging task. Powerful and user-friendly tools are required for efficient data analysis and interpretation. Power BI, a powerful analytics tool capable of producing highly responsive dashboards and included in the Azure cloud ecosystem, was used to visualize and analyze data from the real-time experiments conducted in this project. The image is from a drone flight that traversed each buried pipe in all four locations and lasted under 4 minutes.

After testing several thresholds to identify the magnetic anomalies using the moving standard deviations, the anomalies were charted as illustrated in chart 1204. The anomalies were included in a file with location, magnetic values, moving standard deviation, and flagged to identify the anomalies.

The chart 1204 illustrates the latitude and longitude of the flight path at the bottom plane and the vertical axis is for the detected magnetic field. The anomalies, with the high magnetic values measured, show the locations of the buried pies.

The ML model for detecting pipes utilizes the magnetic data shown in chart 1204 to make estimates on the locations of the buried pipes. Dots 1206 correspond to the identified locations for the buried pipes, and dots 1208 show the locations that are not identified as being above buried pipes.

Figure 13:
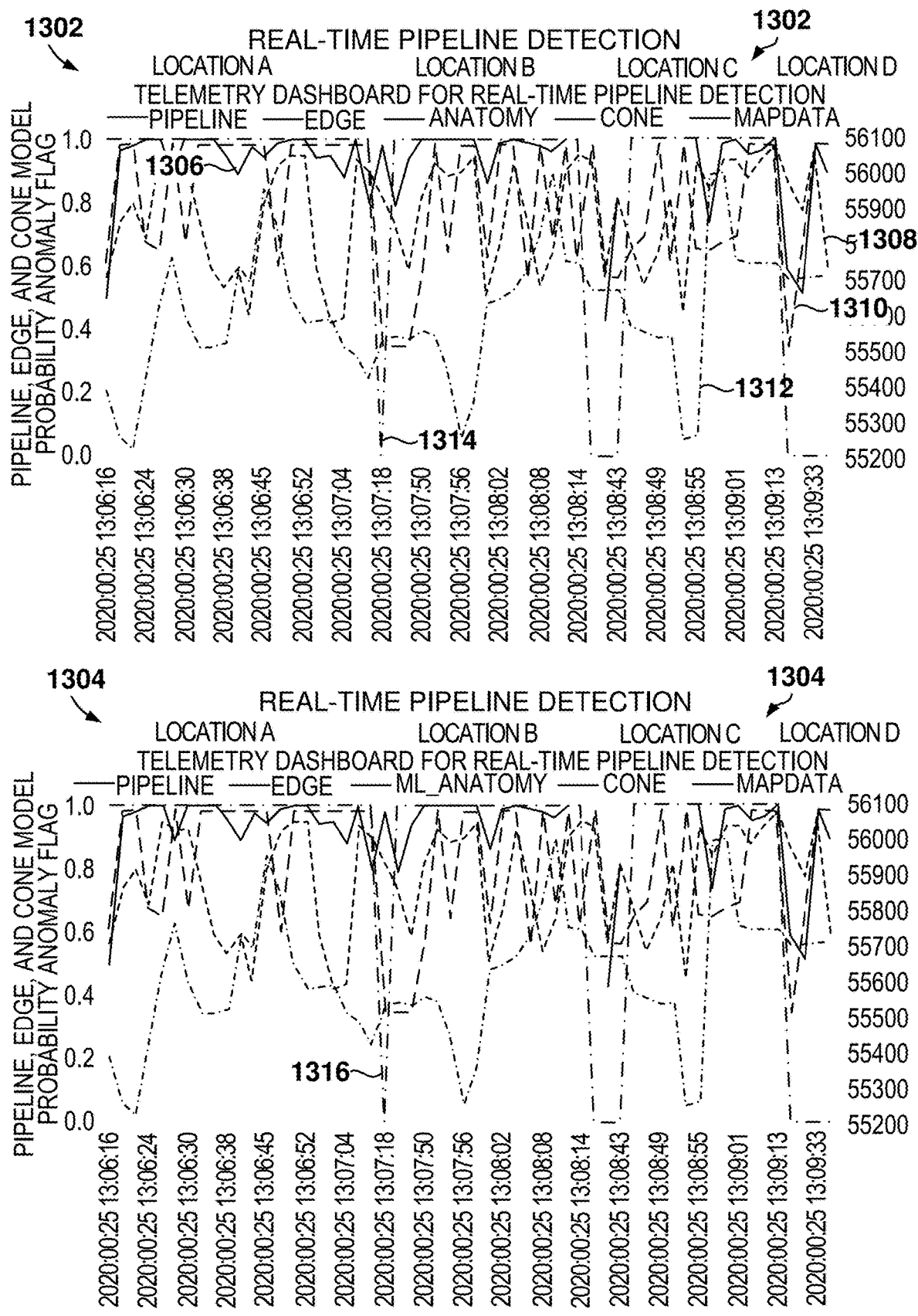
FIG. 13 includes charts showing the results of testing, according to some example embodiments.

FIG. 13 includes charts showing the results of testing, according to some example embodiments. Two ML models were used, a first ML model to analyze images and the second model to analyze magnetic and image data.

The data representing a real-time dataset can be visualize-ordered by the image's time stamp from left to right to simulate a real-time data input of images and associated magnetic values and detection models. An example of a data stream containing the machine learning models developed in this project and matched data taken from this UAS flight is shown in chart 1302. Each time stamp at the bottom represents a unique image that was processed. The different lines correspond to the pipeline, edge, and cone model probability for the image, respectively.

The probabilities estimated by the ML models of detecting a pipe using images are represented by the following curves: 1306 for pipeline model, 1308 for edge model, 1310 for cone model. Further, the 1312 curve represents the magnetic value matched to the image's location, the 1314 curve represents the anomaly flag, and the 1316 curve represents the magnetic ML model in chart 1304.

The 1316 curve corresponds to the pipes' signatures at the time and location when the drone flew above the pipes. The 1316 curve represents the benchmark to which to compare the performance of the machine learning models.

By conducting controlled field experiments, the correct answers for detection are known. This information is not commonly available when ML models are created, which are often tested with synthetic data sets.

Separate ML models were developed for detecting, one using image analysis and the other on magnetic data (a type of geophysical data). Charts 1302 and 1304 show the performance of those models. In some field experiments, the ML models from the image and geophysical data complemented each other, although the geophysical models carry more weight in the decision making unless there is not accurate magnetic data, such when the geophysical sensor fails or the noise in the study is higher than the signal. In this case, the image ML model can be used to complement the magnetic ML model.

In other example embodiments, a combined image and magnetic ML model is used, and it uses both the image data and the magnetic data as inputs to make predictions on the locations of pipelines or spills. In most cases, the magnetic data will continue to carry more weight than the image data because the magnetic data relates to the subsurface, but the image data is used when the magnetic data is not available. This combination provides a more robust ML model.

The good results of the pipeline model should be noted. Most of the estimated probabilities of the pipeline model are close to the benchmark. Some of the discrepancies between these curves are due to different aspects of the machine learning model, for instance, the false positive observed between A and B locations. The image at 13:07:18 was taken when the drone was repositioning between Location A and Location B.

The pipeline model shows a high probability for the image, but no pipeline is at that location in the controlled area. The image recognition models were trained for the drone's shadow but needed additional training to account for shadows from larger objects such as trees. The other false positive, between the B and C locations, is due to the camera view when the images were captured. After flying over the pipeline in Location B, one image was captured between the pipelines and two images captured at the edge of Pipeline C before the drone was flying directly over the pipe. Pipeline model probability increases from 0.43 to 0.81 as the drone approaches the pipeline.

The excellent machine learning results of the magnetic model are evident comparing the 1314 curve, representing the benchmark pipeline anomaly, with the 1316 curve of the magnetic model. The integration of the magnetic model (subsurface information) with the pipeline model (surface information from images) is practical for detecting pipelines. This integration can reduce false positives, such as the one observed between Locations A and B of the pipeline model. Although that false positive of the pipeline model may be avoided with more training, integrating the pipeline and magnetic model can reduce the need for training when one of the models is based on data more sensitive to the target's properties.

Figure 14:
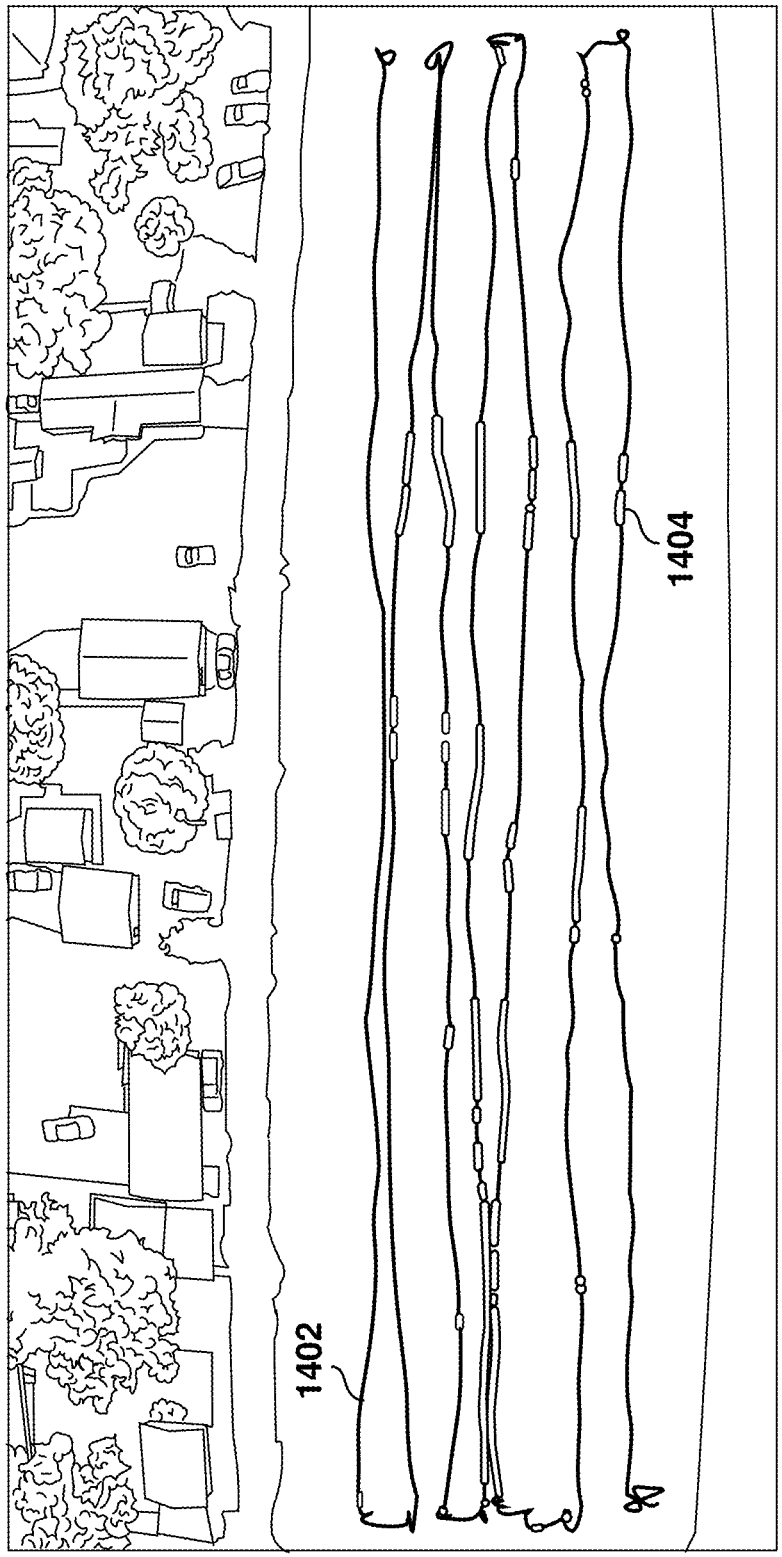
FIG. 14 illustrates the results of the post-processing of data for detecting buried pipelines, according to some example embodiments.

FIG. 14 illustrates the results of the post-processing of data for detecting buried pipelines, according to some example embodiments. After the real-time detection process is carried out, a large volume of useful information and insights is obtained. Postprocessing is primarily created to learn, identify, and correct the real-time process that needs improvement and make the model more accurate and predictable. At this stage, data quality control is performed.

After completing each experiment, useful data obtained from devices such as image data from the drone and magnetic data from the magnetometer can be optimized in the postprocessing phase. The existing logic apps are used to automate the process, as described above with reference to FIG. 8.

When an image is uploaded to the cloud's blob storage, the logic app is invoked, and a series of programming modules are executed. The logic app extracts metadata from the image and makes a query to the data warehouse based on its geolocation to associate an image with the telemetry data (pipeline, cone, and edge probabilities) obtained by the IoT camera in the real-time experiment. This information is later joined with the magnetic data.

For each photo in the image dataset, a latitude and longitude distance calculation was made to find the nearest magnetic value (based on latitude and longitude), and the magnetic anomaly. The final anomaly flag for that photo location was normalized to grab the nearest anomaly value if less than 4 meters away from the photo. Otherwise, the nearest magnetic value is used as long as the value is within a 10-meter radius. This selection was done since a photo captures several meters of ground and at least a meter from directly underneath the UAS and the camera's latitude and longitude, which may include anomaly and non-anomaly values right next to each other. This selection criterion approximates the camera's field view and captures any anomaly values that may be in it.

As the magnetometer swings when attached to the drone, the latitude and longitude values of the magnetometer GPS may not coincide with the drone latitude and longitude at the same time stamp. The data are then consumed by the Power BI module to provide data insights.

The images are also used with the existing custom vision models either for quality control or model refinement. Quality control is done by randomly selecting a newly acquired image and comparing it with one of the IoT camera models' results.

FIG. 14 shows conditioned magnetic data from the buried pipes experiment mapped in Power BI. The map shows magnetic anomalies 1404 and the flight path 1402.

Figure 15:
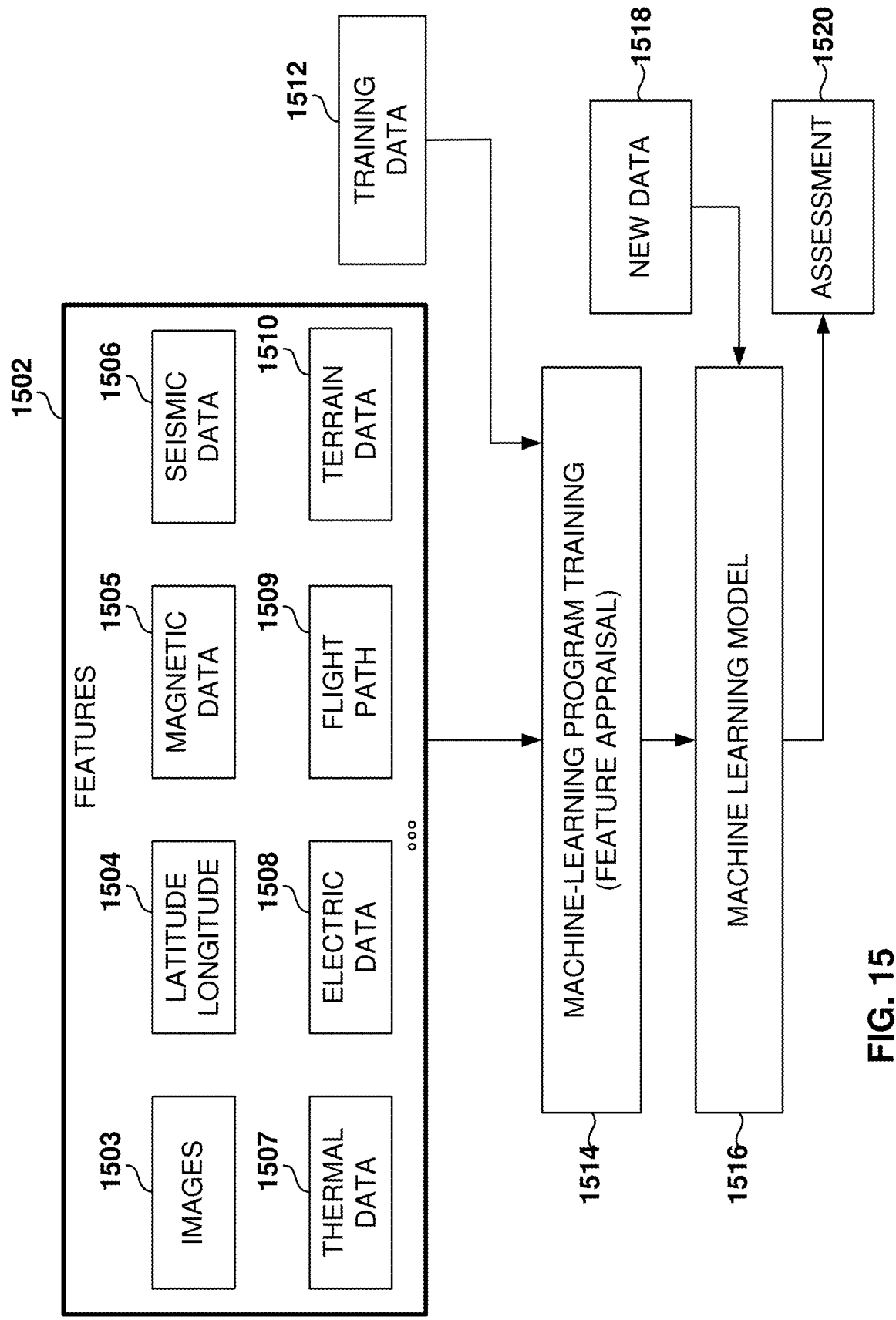
FIG. 15 illustrates the training and use of a machine-learning model, according to some example embodiments.

FIG. 15 illustrates the training and use of a machine-learning model, according to some example embodiments. In some example embodiments, machine-learning (ML) models 1516, are utilized to detect pipelines and spills.

Machine Learning (ML) is an application that provides computer systems the ability to perform tasks, without explicitly being programmed, by making inferences based on patterns found in the analysis of data. Machine learning explores the study and construction of algorithms, also referred to herein as tools, that may learn from existing data and make predictions about new data. Such machine-learning algorithms operate by building an ML model 1516 from example training data 1512 in order to make data-driven predictions or decisions expressed as outputs or assessments 1520. Although example embodiments are presented with respect to a few machine-learning tools, the principles presented herein may be applied to other machine-learning tools. In some embodiments, the ML model 1516 provides a probability that a pipeline is in a given location.

Data representation refers to the method of organizing the data for storage on a computer system, including the structure for the identified features and their values. In ML, it is typical to represent the data in vectors or matrices of two or more dimensions. When dealing with large amounts of data and many features, data representation is important so that the training is able to identify the correlations within the data.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm using information that is neither classified nor labeled, and allowing the algorithm to act on that information without guidance. Unsupervised ML is useful in exploratory analysis because it can automatically identify structure in data.

Common tasks for supervised ML are classification problems and regression problems. Classification problems, also referred to as categorization problems, aim at classifying items into one of several category values (for example, is this object an apple or an orange?). Regression algorithms aim at quantifying some items (for example, by providing a score to the value of some input). Some examples of commonly used supervised-ML algorithms are Logistic Regression (LR), Naive-Bayes, Random Forest (RF), neural networks (NN), deep neural networks (DNN), matrix factorization, and Support Vector Machines (SVM).

Some common tasks for unsupervised ML include clustering, representation learning, and density estimation. Some examples of commonly used unsupervised-ML algorithms are K-means clustering, principal component analysis, and autoencoders.

The training data 1512 comprises examples of values for the features 1502. In some example embodiments, the training data 1512 comprises labeled data with examples of values for the features 1502 and labels indicating the outcome, such as the location of the buried pipe. The machine-learning algorithms utilize the training data 1512 to find correlations among identified features 1502 that affect the outcome. A feature 1502 is an individual measurable property of a phenomenon being observed. The concept of a feature is related to that of an explanatory variable used in statistical techniques such as linear regression. Choosing informative, discriminating, and independent features is important for effective operation of ML in pattern recognition, classification, and regression. Features may be of different types, such as numeric features, strings, and graphs.

In one example embodiment, the features 1502 may be of different types and may include one or more of images 1503, location (latitude and longitude) 1504, magnetic data 1505 at the given location, seismic data 1506, thermal data 1507, electric data 1508, flight path 1509 (including timestamps), terrain data 1510 (e.g., clay, rocks), etc.

During training 1514, the ML program, also referred to as ML algorithm or ML tool, analyzes the training data 1512 based on identified features 1502 and configuration parameters defined for the training. The result of the training 1514 is the ML model 1516 that is capable of taking inputs to produce assessments 1520.

Training an ML algorithm involves analyzing large amounts of data (e.g., from several gigabytes to a terabyte or more) in order to find data correlations. The ML algorithms utilize the training data 1512 to find correlations among the identified features 1502 that affect the outcome or assessment 1520. In some example embodiments, the training data 1512 includes labeled data, which is known data for one or more identified features 1502 and one or more outcomes, such as pipe is buried underneath, there is a spill underneath, etc.

The ML algorithms usually explore many possible functions and parameters before finding what the ML algorithms identify to be the best correlations within the data; therefore, training may make use of large amounts of computing resources and time.

When the ML model 1516 is used to perform an assessment, new data 1518 is provided as an input to the ML model 1516, and the ML model 1516 generates the assessment 1520 as output. For example, when new data 1518 from the drone is analyzed, the model 1516 identifies locations for the buried pipeline.

Figure 16:
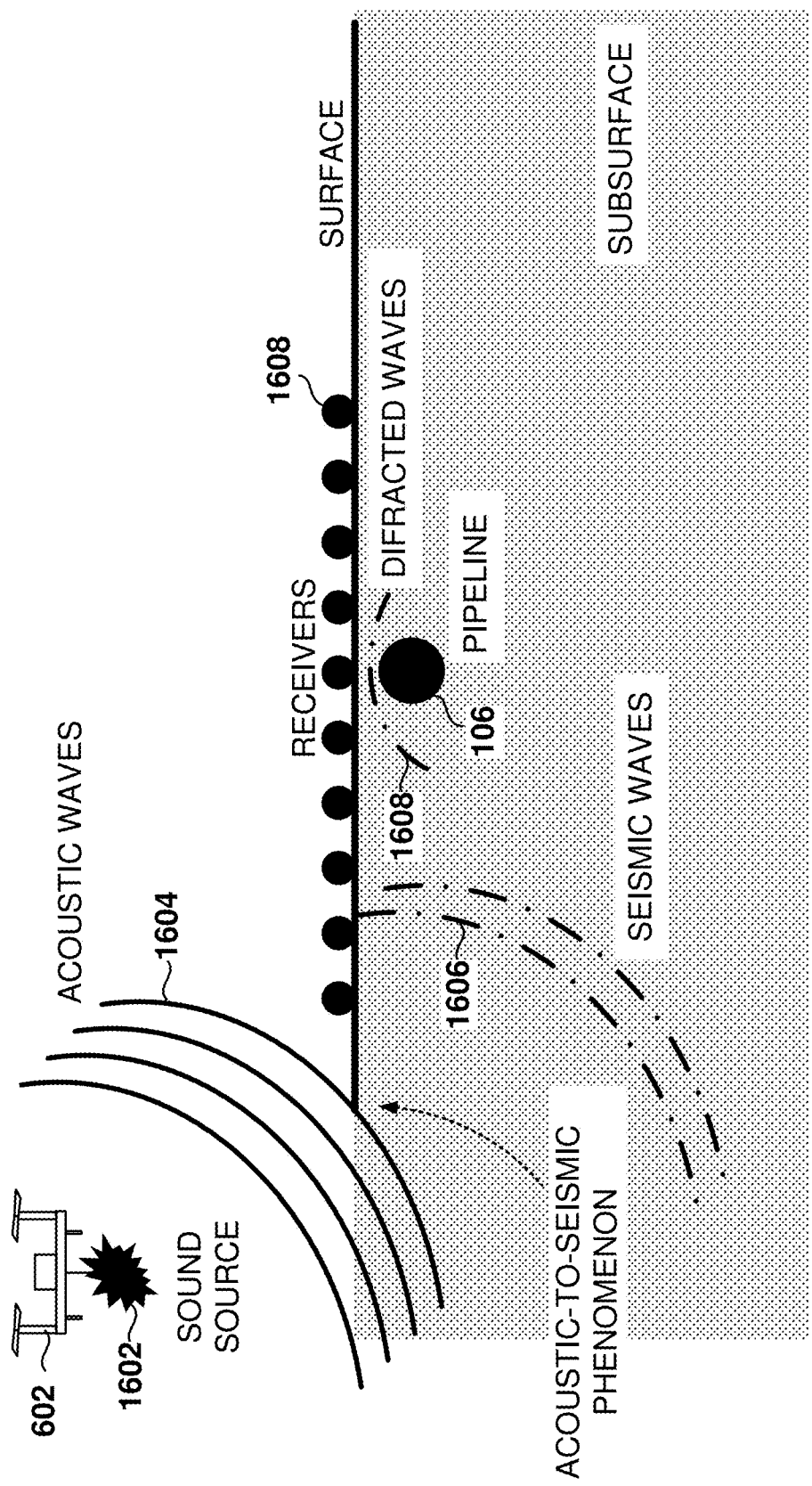
FIG. 16 illustrates pipe detection utilizing acoustic waves, according to some example embodiments.

FIG. 16 illustrates pipe detection utilizing acoustic waves, according to some example embodiments. A sound source 1602 is installed on a drone 602 and when the sound source 1602 generates the sound (e.g., a loud boom, an explosion), acoustic waves 1604 are generated.

A plurality of seismic receivers 1608 are placed spaced apart on the surface. In some example embodiments, ten receives 1608 are placed on a straight line spaced out by a meter, but other embodiments may utilize a different number of receivers (e.g., 2 to 50) and placed in a different configuration, e.g., a circle, eight square, a cross, etc.

When the acoustic waves 1604 reach the surface, the acoustic waves 1604 generate seismic waves 1606, caused by an acoustic-to-seismic phenomenon, where the sound energy is converted into seismic energy.

The seismic waves 1606 then travel through the earth and when they reach that pipeline 106, diffracted waves 1608 are generated. The seismic receivers 1608 are configured to record the seismic activity, which includes recording the diffracted waves 1608.

Since the receivers 1608 are spaced apart, the diffracted waves from the pipeline 106 will reach the receivers 1608 at different times. By analyzing the seismic data received by the different receivers 1608, it is possible to calculate the location of the buried pipeline 106.

Figure 17:
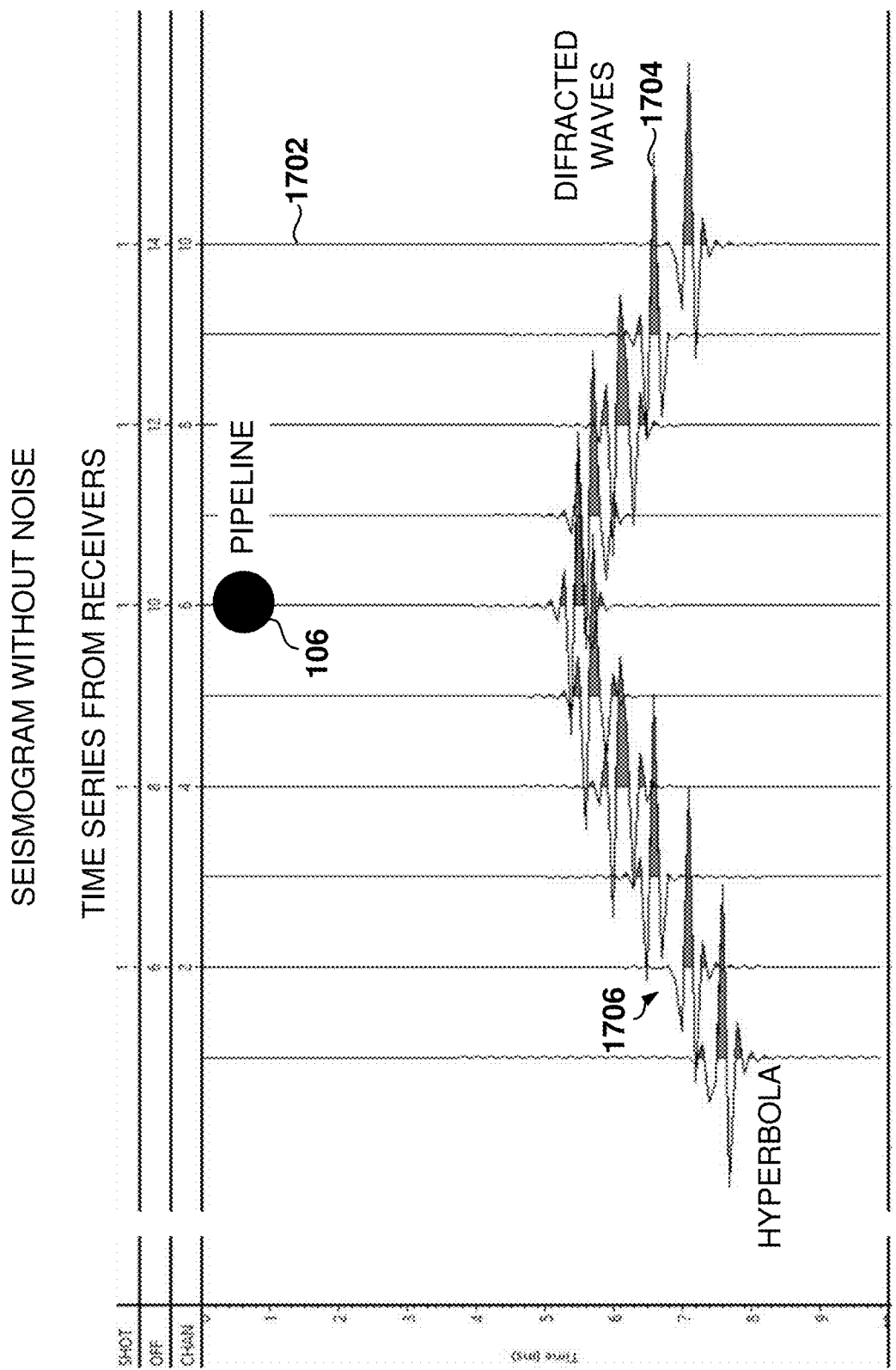
FIG. 17 shows seismographic measurements in the absence of noise, according to some example embodiments.

FIG. 17 shows seismographic measurements in the absence of noise, according to some example embodiments. FIG. 17 shows example seismograms from the plurality of seismic receivers, each vertical line corresponding to one of the receivers.

In this example, the pipeline 106 is above receiver 6. Visual inspection of the side-by-side seismograms shows that a hyperbola is formed, where receiver #6 is the first one to detect the disturbance followed in order by the receivers on each side.

Thus, it is calculated that the pipeline is buried under receiver 6. If the pipeline 106, were between two receivers, then the hyperbola would shift and not be symmetrical, but given the symmetry here, the pipeline will be buried approximately under receiver 6.

Figure 18:
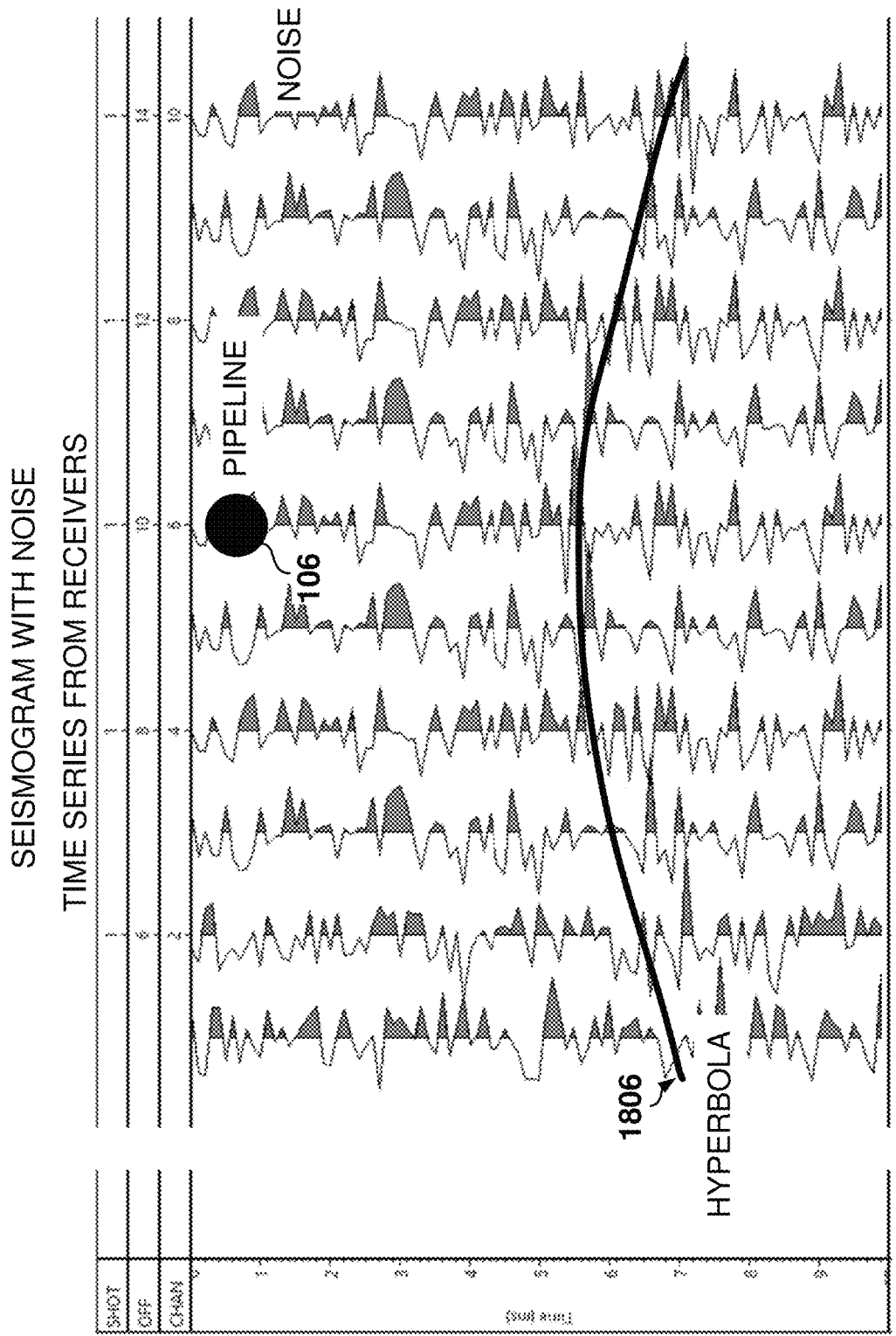
FIG. 18 shows seismographic measurements in the presence of noise, according to some example embodiments.

FIG. 18 shows seismographic measurements in the presence of noise, according to some example embodiments. When there is noise in the area, such as noise naturally occurring due to natural phenomena (e.g., river running nearby) or artificial causes (e.g., construction nearby), the seismic readings may be affected.

However, by analyzing the data over a period of time, the noise levels can be categorized and filtered. The result is that the hyperbola 1806 may also be observed, even in the presence of noise by correlating the noise and the sound in the vicinity. The sound from the generated seismic activity will generate a bigger amplitude signal than noise in most cases; therefore, it is also possible to use this technique to detect buried pipelines in the presence of noise.

In some example embodiments, the satellite images of the area provide clues or where to place the receivers. For example, in a situation as the one described in FIG. 1, the lack of vegetation on straight lines is a clear indication that the pipelines will probably be buried underneath.

Figure 19:
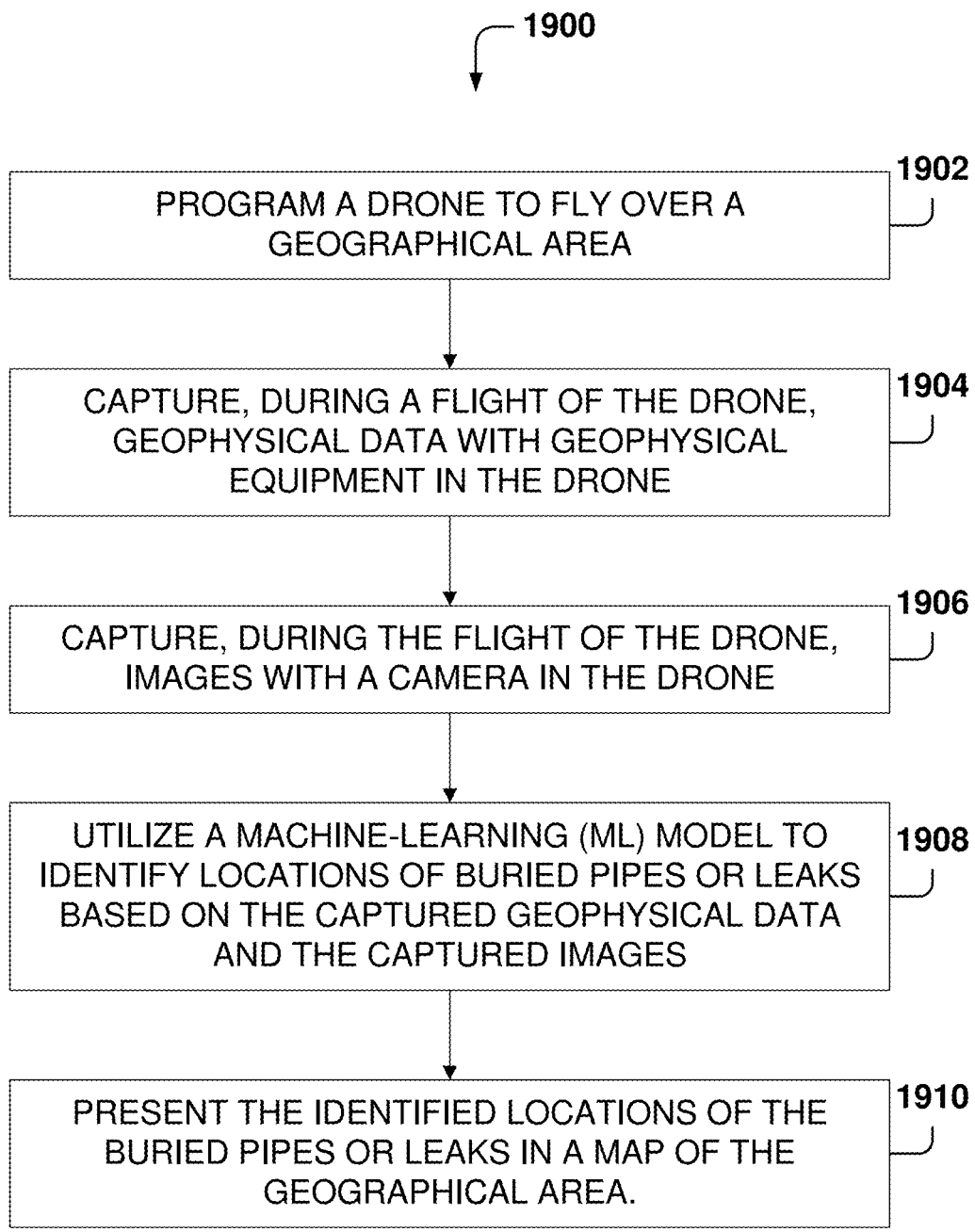
FIG. 19 is a flowchart of a method for detecting buried pipelines and spills, according to some example embodiments.

FIG. 19 is a flowchart of a method 1900 for detecting buried pipelines and spills, according to some example embodiments. While the various operations in this flowchart are presented and described sequentially, one of ordinary skill will appreciate that some or all of the operations may be executed in a different order, be combined or omitted, or be executed in parallel.

Operation 1902 is for programming a drone to fly over a geographical area. From operation 1902, the method 1900 flows to operation 1904 for capturing, during a flight of the drone, geophysical data with geophysical equipment in the drone.

From operation 1904, the method 1900 flows to operation 1906 for capturing, during the flight of the drone, images with a camera in the drone.

From operation 1906, the method 1900 flows to operation 1908, where a ML model is utilized to identify locations of buried pipes or leaks based on the captured geophysical data and the captured images.

From operation 1908, the method 1900 flows to operation 1910 for presenting the identified locations of the buried pipes or leaks in a map of the geographical area.

In one example, the ML model is trained with a training set comprising location of known underground pipes, images of a surface above the known underground pipes, and magnetic measurements taken over the known underground pipes.

In one example, the training set includes features comprising one or more of images, location coordinates, magnetic data, seismic data, thermal data, and terrain data.

In one example, the geophysical data includes magnetic measurements.

In one example, the geophysical data includes one of electric-field data, seismic data, or thermal data.

In one example, a first ML model is executing on a processor carried by the drone.

In one example, a second ML model is executing on an edge processor in communication with the drone.

In one example, a third ML model is executing on a cloud service for postprocessing analysis of the captured images and geophysical data.

In one example, identifying the locations includes detecting magnetic anomalies in the locations.

In one example, presenting the identified locations further includes providing a dashboard user interface for presenting the identified locations.

Another general aspect is for a system that includes a memory comprising instructions and one or more computer processors. The instructions, when executed by the one or more computer processors, cause the one or more computer processors to perform operations comprising: programming a drone to fly over a geographical area; capturing, during a flight of the drone, geophysical data with geophysical equipment in the drone; capturing, during the flight of the drone, images with a camera in the drone; utilizing a machine-learning (ML) model to identify locations of buried pipes based on the captured geophysical data and the captured images; and presenting the identified locations of the buried pipes in a map of the geographical area.

In yet another general aspect, a machine-readable storage medium (e.g., a non-transitory storage medium) includes instructions that, when executed by a machine, cause the machine to perform operations comprising: programming a drone to fly over a geographical area; capturing, during a flight of the drone, geophysical data with geophysical equipment in the drone; capturing, during the flight of the drone, images with a camera in the drone; utilizing a machine-learning (ML) model to identify locations of buried pipes based on the captured geophysical data and the captured images; and presenting the identified locations of the buried pipes in a map of the geographical area.

Figure 20:
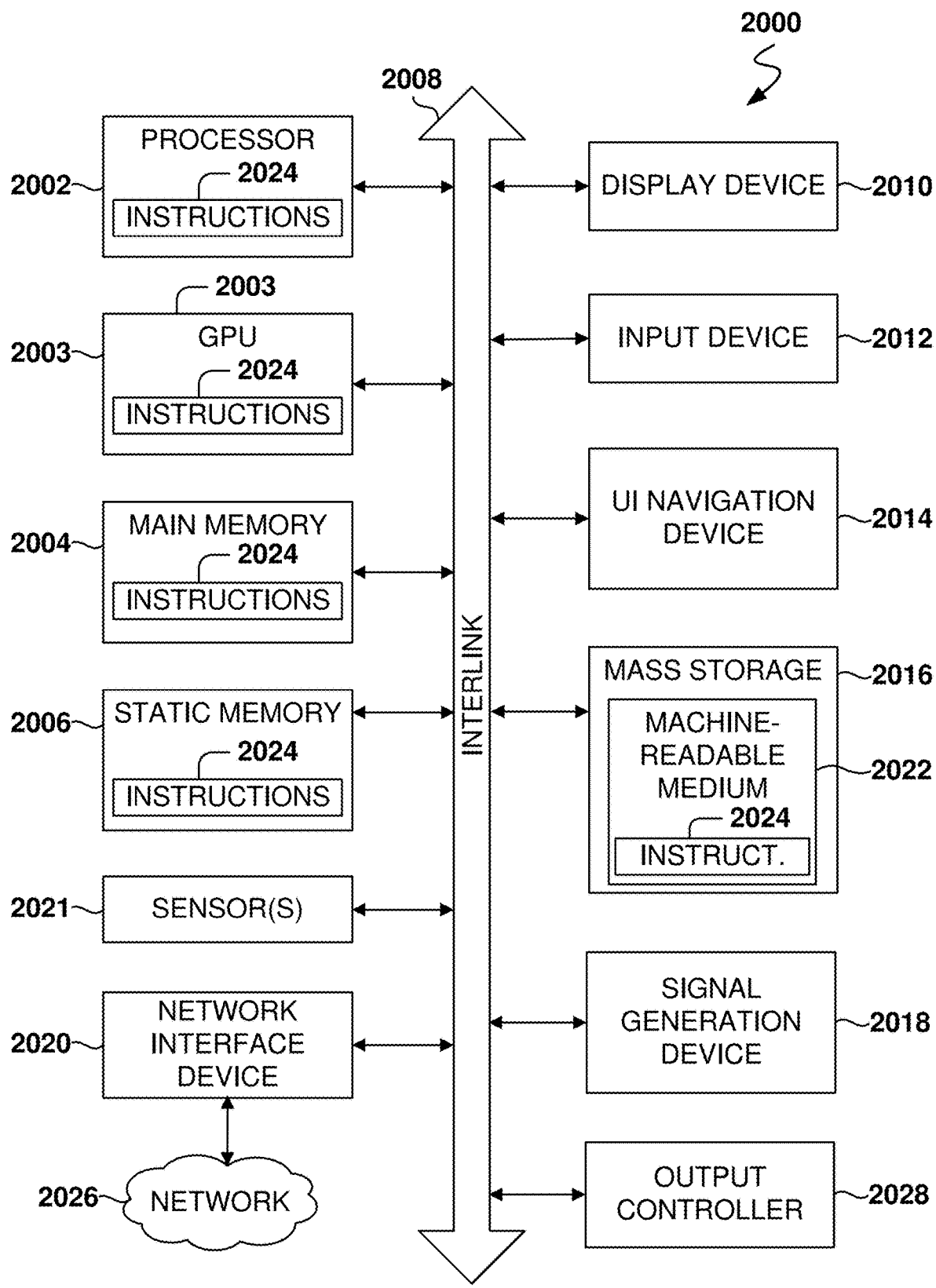
FIG. 20 is a block diagram illustrating an example of a machine upon or by which one or more example process embodiments described herein may be implemented or controlled.

FIG. 20 is a block diagram illustrating an example of a machine 2000 upon or by which one or more example process embodiments described herein may be implemented or controlled. In alternative embodiments, the machine 2000 may operate as a standalone device or may be connected (e.g., networked) to other machines. In a networked deployment, the machine 2000 may operate in the capacity of a server machine, a client machine, or both in server-client network environments. In an example, the machine 2000 may act as a peer machine in a peer-to-peer (P2P) (or other distributed) network environment. Further, while only a single machine 2000 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 2000 may include a hardware processor 2002 (e.g., a central processing unit (CPU), a hardware processor core, or any combination thereof), a graphics processing unit (GPU) 2003, a main memory 2004, and a static memory 2006, some or all of which may communicate with each other via an interlink (e.g., bus) 2008. The machine 2000 may further include a display device 2010, an alphanumeric input device 2012 (e.g., a keyboard), and a user interface (UI) navigation device 2014 (e.g., a mouse). In an example, the display device 2010, alphanumeric input device 2012, and UI navigation device 2014 may be a touch screen display. The machine 2000 may additionally include a mass storage device (e.g., drive unit) 2016, a signal generation device 2018 (e.g., a speaker), a network interface device 2020, and one or more sensors 2021, such as a Global Positioning System (GPS) sensor, compass, accelerometer, or another sensor. The machine 2000 may include an output controller 2028, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 2016 may include a machine-readable medium 2022 on which is stored one or more sets of data structures or instructions 2024 (e.g., software) embodying or utilized by any one or more of the techniques or functions described herein. The instructions 2024 may also reside, completely or at least partially, within the main memory 2004, within the static memory 2006, within the hardware processor 2002, or within the GPU 2003 during execution thereof by the machine 2000. In an example, one or any combination of the hardware processor 2002, the GPU 2003, the main memory 2004, the static memory 2006, or the mass storage device 2016 may constitute machine-readable media.

While the machine-readable medium 2022 is illustrated as a single medium, the term "machine-readable medium" may include a single medium, or multiple media, (e.g., a centralized or distributed database, and/or associated caches and servers) configured to store the one or more instructions 2024.

The term "machine-readable medium" may include any medium that is capable of storing, encoding, or carrying instructions 2024 for execution by the machine 2000 and that cause the machine 2000 to perform any one or more of the techniques of the present disclosure, or that is capable of storing, encoding, or carrying data structures used by or associated with such instructions 2024. Non-limiting machine-readable medium examples may include solid-state memories, and optical and magnetic media. In an example, a massed machine-readable medium comprises a machine-readable medium 2022 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 2024 may further be transmitted or received over a communications network 2026 using a transmission medium via the network interface device 2020.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
training a machine-learning (ML) model to identify locations of buried pipes, the training based on a training set comprising locations of known buried pipes, images of a surface above the known buried pipes, and magnetic measurements taken over the known buried pipes;
programming a drone to fly over a geographical area with a first buried pipe, the programming based on an approximate location of the first buried pipe;
capturing, during a flight of the drone, geophysical data with geophysical equipment in the drone;
capturing, during the flight of the drone, images with a camera in the drone;
utilizing the machine-learning (ML) model to identify the location of the first buried pipe based on the captured geophysical data and the captured images; and
presenting the identified location of the first buried pipe in a map of the geographical area.

2. The method as recited in claim 1, wherein the training set includes features comprising one or more of images, location coordinates, magnetic data, seismic data, thermal data, and terrain data.

3. The method as recited in claim 1, wherein the geophysical data includes magnetic measurements.

4. The method as recited in claim 1, wherein the geophysical data includes one of electric-field data, seismic data, or thermal data.

5. The method as recited in claim 1, wherein a first ML model is executing on a processor carried by the drone, the first ML model generating an output with the location of the first buried pipe based on sensor data captured by sensors in the drone.

6. The method as recited in claim 1, wherein a second ML model is executing on an edge processor in communication with the drone, the second ML model generating an output with the location of the first buried pipe based on sensor data captured by sensors in the drone.

7. The method as recited in claim 1, wherein a third ML model is executing on a cloud service for postprocessing analysis of the captured images and geophysical data, the third ML model generating an output with the location of the first buried pipe based on sensor data captured by sensors in the drone.

8. The method as recited in claim 1, further comprising:
flying the drone on a predefined pattern over the approximate location of the first buried pipe;
detecting magnetic anomalies in the locations based on a magnetic measurement threshold; and
identifying another estimate of the location of the first buried pipe based on the detected magnetic anomalies.

9. The method as recited in claim 1, wherein presenting the identified locations further includes:
providing a dashboard user interface for presenting the identified locations.

10. A system comprising:
a memory comprising instructions; and
one or more computer processors, wherein the instructions, when executed by the one or more computer processors, cause the system to perform operations comprising:
training a machine-learning (ML) model to identify locations of buried pipes, the training based on a training set comprising locations of known buried pipes,
images of a surface above the known buried pipes, and magnetic measurements taken over the known buried pipes;
programming a drone to fly over a geographical area with a first buried pipe, the programming based on an approximate location of the first buried pipe;
capturing, during a flight of the drone, geophysical data with geophysical equipment in the drone;
capturing, during the flight of the drone, images with a camera in the drone;
utilizing the machine-learning (ML) model to identify the location of the first buried pipe based on the captured geophysical data and the captured images; and
presenting the identified location of the first buried pipe in a map of the geographical area.

11. The system as recited in claim 10, wherein the training set includes features comprising one or more of images, location coordinates, magnetic data, seismic data, thermal data, and terrain data.

12. The system as recited in claim 10, wherein the geophysical data includes magnetic measurements.

13. The system as recited in claim 10, wherein the geophysical data includes one of electric-field data, seismic data, or thermal data.

14. The system as recited in claim 10, wherein the instructions further cause the one or more computer processors to perform operations comprising:
flying the drone on a predefined pattern over the approximate location of the first buried pipe;
detecting magnetic anomalies in the locations based on a magnetic measurement threshold; and
identifying another estimate of the location of the first buried pipe based on the detected magnetic anomalies.

15. A non-transitory machine-readable storage medium including instructions that, when executed by a machine, cause the machine to perform operations comprising:
training a machine-learning (ML) model to identify locations of buried pipes, the training based on a training set comprising locations of known buried pipes, images of a surface above the known buried pipes, and magnetic measurements taken over the known buried pipes;

programming a drone to fly over a geographical area with a first buried pipe, the programming based on an approximate location of the first buried pipe;

capturing, during a flight of a drone, geophysical data with geophysical equipment in the drone;

capturing, during the flight of the drone, images with a camera in the drone;

utilizing the machine-learning (ML) model to identify the location of the first buried pipe based on the captured geophysical data and the captured images; and presenting the identified location of the first buried pipe in a map of the geographical area.

16. The non-transitory machine-readable storage medium as recited in claim 15, wherein the training set includes features comprising one or more of images, location coordinates, magnetic data, seismic data, thermal data, and terrain data.

17. The non-transitory machine-readable storage medium as recited in claim 15, wherein the geophysical data includes magnetic measurements.

18. The non-transitory machine-readable storage medium as recited in claim 15, wherein the geophysical data includes one of electric-field data, seismic data, or thermal data.

19. The non-transitory machine-readable storage medium as recited in claim 15, wherein the machine further performs operations comprising:

flying the drone on a predefined pattern over the approximate location of the first buried pipe;

detecting magnetic anomalies in the locations based on a magnetic measurement threshold; and identifying another estimate of the location of the first buried pipe based on the detected magnetic anomalies.

20. A computer-implemented method comprising:

obtaining an image ML model for analyzing images and estimating a location of a buried pipe;

obtaining a magnetic ML model for analyzing magnetic data and estimating the location of the buried pipe;

programming a drone to fly over a geographical area with a first buried pipe, the programming based on an approximate location of the first buried pipe;

capturing, during a flight of the drone, magnetic data with geophysical equipment in the drone;

capturing, during the flight of the drone, images with a camera in the drone;

utilizing the image ML model to output the location of the first buried pipe based on the captured images;

utilizing the magnetic ML model to output the location of the first buried pipe based on the captured magnetic data;

determining the location of the first buried pipe based on the outputs of the image ML model and the magnetic ML model; and presenting the determined location of the first buried pipe in a map of the geographical area.

* * * * *